US011930152B2

(12) United States Patent
Hayashi

(10) Patent No.: US 11,930,152 B2
(45) Date of Patent: Mar. 12, 2024

(54) RECORDING CONTROL DEVICE AND RECORDING CONTROL METHOD

(71) Applicant: SEIKO EPSON CORPORATION, Tokyo (JP)

(72) Inventor: Takuma Hayashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 86 days.

(21) Appl. No.: 17/480,183

(22) Filed: Sep. 21, 2021

(65) Prior Publication Data

US 2022/0088920 A1 Mar. 24, 2022

(30) Foreign Application Priority Data

Sep. 23, 2020 (JP) ................................. 2020-158896

(51) Int. Cl.
*H04N 1/58* (2006.01)
*B41J 2/045* (2006.01)
*B41J 2/135* (2006.01)
*G06F 3/12* (2006.01)
*G06K 15/02* (2006.01)

(52) U.S. Cl.
CPC ............ *H04N 1/58* (2013.01); *B41J 2/04581* (2013.01)

(58) Field of Classification Search
None
See application file for complete search history.

(56) References Cited

U.S. PATENT DOCUMENTS

| 2005/0237352 | A1* | 10/2005 | Yoneyama | B41J 2/21 347/9 |
| 2006/0187491 | A1* | 8/2006 | Sakai | H04N 1/405 358/1.9 |
| 2012/0075372 | A1* | 3/2012 | Yamamoto | B41J 2/2107 347/14 |
| 2015/0375503 | A1* | 12/2015 | Sato | B41J 2/2139 347/9 |

FOREIGN PATENT DOCUMENTS

| JP | 2011073153 | * | 4/2011 | ................ B41J 2/01 |
| JP | 2015229333 | * | 12/2015 | ................ B41J 2/01 |
| JP | 2016-055503 | A | 4/2016 | |
| JP | 2018-069603 | A | 5/2018 | |
| JP | 2018069603 | * | 5/2018 | ................ B41J 2/01 |

* cited by examiner

*Primary Examiner* — Beniyam Menberu
(74) *Attorney, Agent, or Firm* — Global IP Counselors, LLP

(57) ABSTRACT

A plurality of nozzle rows include a first nozzle row including first nozzles, a second nozzle row including second nozzles, and a third nozzle row including third nozzles. The third nozzle row is provided between the first nozzle row and the second nozzle row in a relative movement direction. When the first ink from the first nozzle is replaced at least by the second ink from the second nozzle and the third ink from the third nozzle, an edge portion of an output image to be formed is formed in such a manner that a first use rate is lower than a second use rate, the first use rate being a use rate of the second nozzle for the edge portion of the output image, the second use rate being a use rate of the second nozzle for a non-edge portion of the output image.

6 Claims, 15 Drawing Sheets

LUTb

| R | G | B | K | C | M | Y | Lk |
|---|---|---|---|---|---|---|----|
| 0 | 0 | 0 | 255 | 0 | 0 | 0 | 0 |
| ⋮ | ⋮ | ⋮ | ⋮ | ⋮ | ⋮ | ⋮ | ⋮ |
| Ri | Gi | Bi | Ki | Ci | Mi | Yi | Lki |
| ⋮ | ⋮ | ⋮ | ⋮ | ⋮ | ⋮ | ⋮ | ⋮ |

LUTn

| R | G | B | K | C | M | Y | Lk |
|---|---|---|---|---|---|---|----|
| 0 | 0 | 0 | 0 | 64 | 64 | 64 | 63 |
| ⋮ | ⋮ | ⋮ | ⋮ | ⋮ | ⋮ | ⋮ | ⋮ |
| Ri | Gi | Bi | 0 | CNi | MNi | YNi | LkNi |
| ⋮ | ⋮ | ⋮ | ⋮ | ⋮ | ⋮ | ⋮ | ⋮ |

LUTe

| R | G | B | K | C | M | Y | Lk |
|---|---|---|---|---|---|---|----|
| 0 | 0 | 0 | 0 | 112 | 112 | 31 | 0 |
| ⋮ | ⋮ | ⋮ | ⋮ | ⋮ | ⋮ | ⋮ | ⋮ |
| Ri | Gi | Bi | 0 | CEi | MEi | YEi | LkEi |
| ⋮ | ⋮ | ⋮ | ⋮ | ⋮ | ⋮ | ⋮ | ⋮ |

LkEi < LkNi
YEi < YNi
LkEi < YEi

FIG. 10

RECORDING CONTROL DEVICE AND RECORDING CONTROL METHOD

The present application is based on, and claims priority from JP Application Serial Number 2020-158896, filed Sep. 23, 2020, the disclosure of which is hereby incorporated by reference herein in its entirety.

BACKGROUND

1. Technical Field

The present disclosure relates to a recording control device and a recording control method for controlling formation of an output image on a medium.

2. Related Art

Recording devices that form a color image typically include a recording head including at least a black nozzle row for discharging black ink, a cyan nozzle row for discharging cyan ink, a magenta nozzle row for discharging magenta ink, and a yellow nozzle row for discharging yellow ink. Ink drops discharged from a normal nozzle turn into dots when they impinge on the medium. Since each nozzle is microscopic, some nozzles may not form normal dots. As a recording device, inkjet printers are known that perform composite completion with dots of multiple types of color inks when black ink dots are not formed. In JP-A-2016-55503, composite completion is described in which cyan, magenta, and yellow dots are formed with ink droplets discharged from alternative nozzles of cyan, magenta, and yellow inks when black dots are not formed at a nozzle of black ink.

Printed images may include an image including an edge portion, such as a code image such as a barcode, a character, and a line drawing. In addition, the recording head may include an inclination error in a direction of rotation along the nozzle surface. If composite completion is performed in the edge portion using the recording head with an inclination error, the impinging position of the color ink dot is shifted from the designed position, and the edge portion is lightly spread. For example, if the edge portion is lightly spread, the reader may not be able to read it correctly since the thickness is an important factor for a barcode.

The above-mentioned problem arises also when black ink dots are replaced by multiple types of color ink dots due to a resolution conversion in which black information is replaced by color information.

SUMMARY

A recording control device of an embodiment the present disclosure configured to control recording on a medium by a recording head including a plurality of nozzle rows, and a relative movement of the recording head and the medium in a relative movement direction that intersects a nozzle alignment direction of the nozzle row. The plurality of nozzle rows include a first nozzle row including a plurality of first nozzles configured to discharge first ink, a second nozzle row including a plurality of second nozzles configured to discharge second ink, and a third nozzle row including a plurality of third nozzles configured to discharge third ink. The third nozzle row is provided between the first nozzle row and the second nozzle row in the relative movement direction. A first control section configured to form an edge portion of an output image to be formed on the medium, and a second control section configured to form a non-edge portion of the output image are provided. When the first ink to be discharged from the first nozzle is replaced at least by the second ink to be discharged from the second nozzle and the third ink to be discharged from the third nozzle, the first control section forms the edge portion in such a manner that a first use rate is lower than a second use rate, the first use rate being a use rate of the second nozzle for the edge portion, the second use rate being a use rate of the second nozzle for the non-edge portion.

A recording control method of an embodiment the present disclosure is a method of controlling recording on a medium by a recording head including a plurality of nozzle rows, and a relative movement of the recording head and the medium in a relative movement direction that intersects a nozzle alignment direction of the nozzle row. The plurality of nozzle rows include a first nozzle row including a plurality of first nozzles configured to discharge first ink, a second nozzle row including a plurality of second nozzles configured to discharge second ink, and a third nozzle row including a plurality of third nozzles configured to discharge third ink. The third nozzle row is provided between the first nozzle row and the second nozzle row in the relative movement direction. The method includes forming an output image on the medium in such a manner that a first use rate is lower than a second use rate when the first ink to be discharged from the first nozzle is replaced at least by the second ink to be discharged from the second nozzle and the third ink to be discharged from the third nozzle, the first use rate being a use rate of the second nozzle in an edge portion of the output image, the second use rate being a use rate of the second nozzle in an non-edge portion of the output image.

BRIEF DESCRIPTION OF THE DRAWINGS

FIG. 10 is a drawing schematically illustrating an example of a structure of a color conversion table stored in a storage device.

DESCRIPTION OF EXEMPLARY EMBODIMENTS

Figure 1:
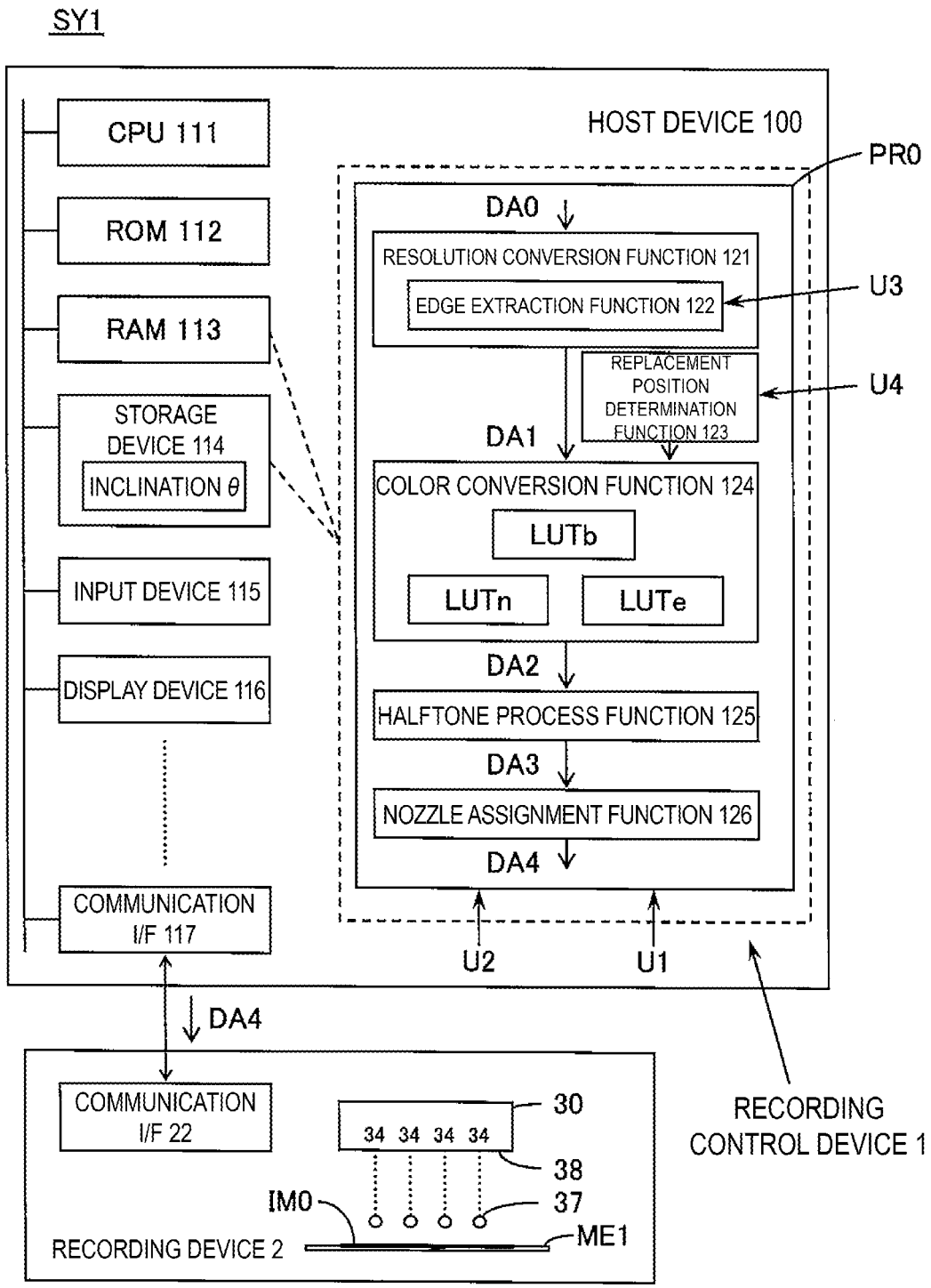
FIG. 1 is a drawing schematically illustrating an example of a recording control system including a recording control device.

Embodiments of the present disclosure are described below. Naturally, the embodiments described below are merely examples of the present disclosure, and not all of the features described in the embodiments may be essential to the solution of the disclosure.

1. OVERVIEW OF TECHNIQUE ENCOMPASSED IN PRESENT DISCLOSURE

First, an overview of techniques encompassed in the present disclosure is described with reference to examples illustrated in FIGS. 1 to 15. Note that the drawings of the subject application schematically illustrate examples, and the magnification in each direction in the drawings may be different from each other, and, the drawings may not be consistent with each other. Naturally, the elements of the present technology are not limited to the specific examples denoted with the reference numerals. In "Overview of Technique Encompassed in Present Disclosure", the words in the parentheses are a supplementary explanation of the preceding term.

First Aspect

Figure 2:
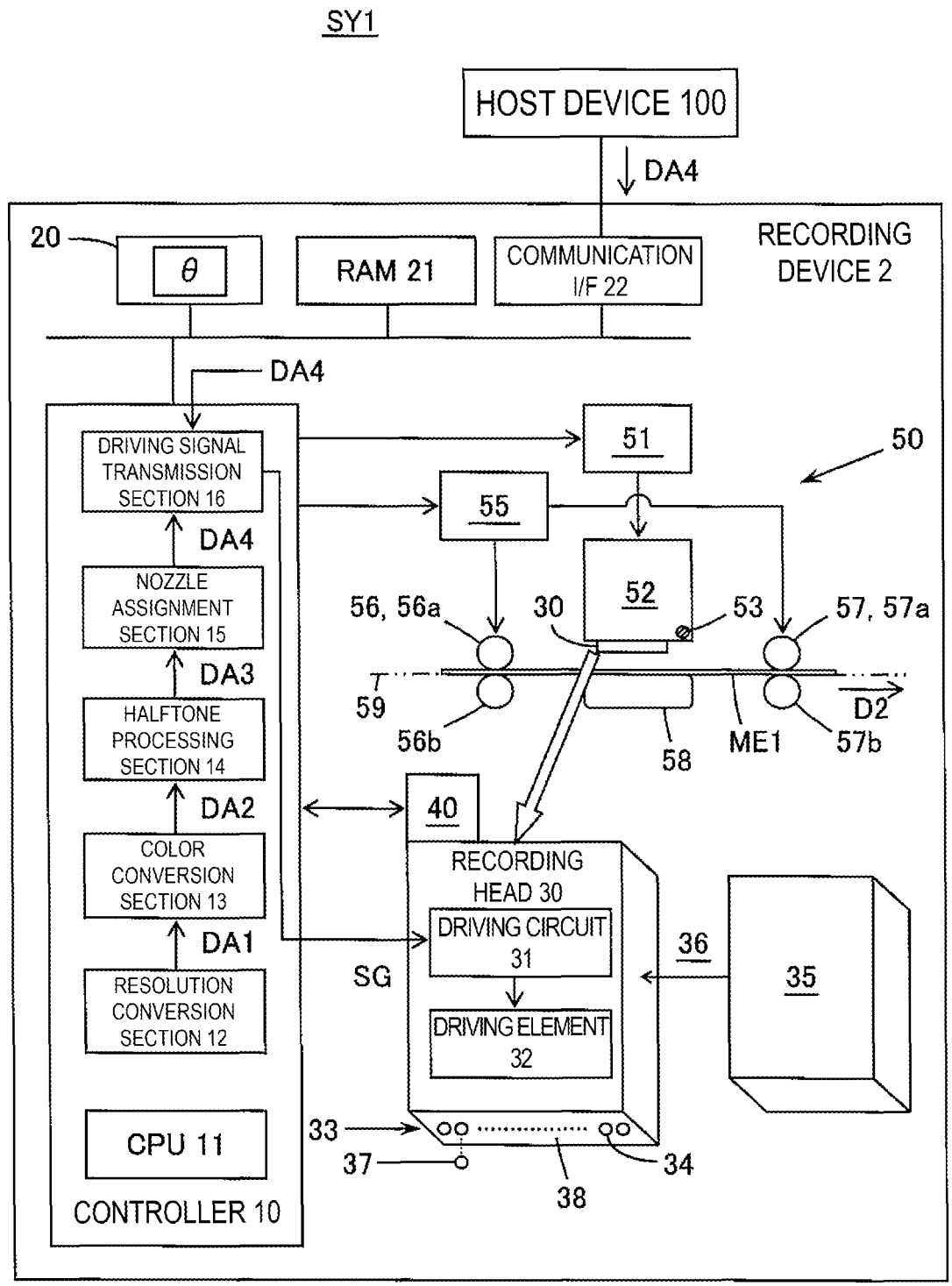
FIG. 2 is a drawing schematically illustrating an example of a recording device.
Figure 3:
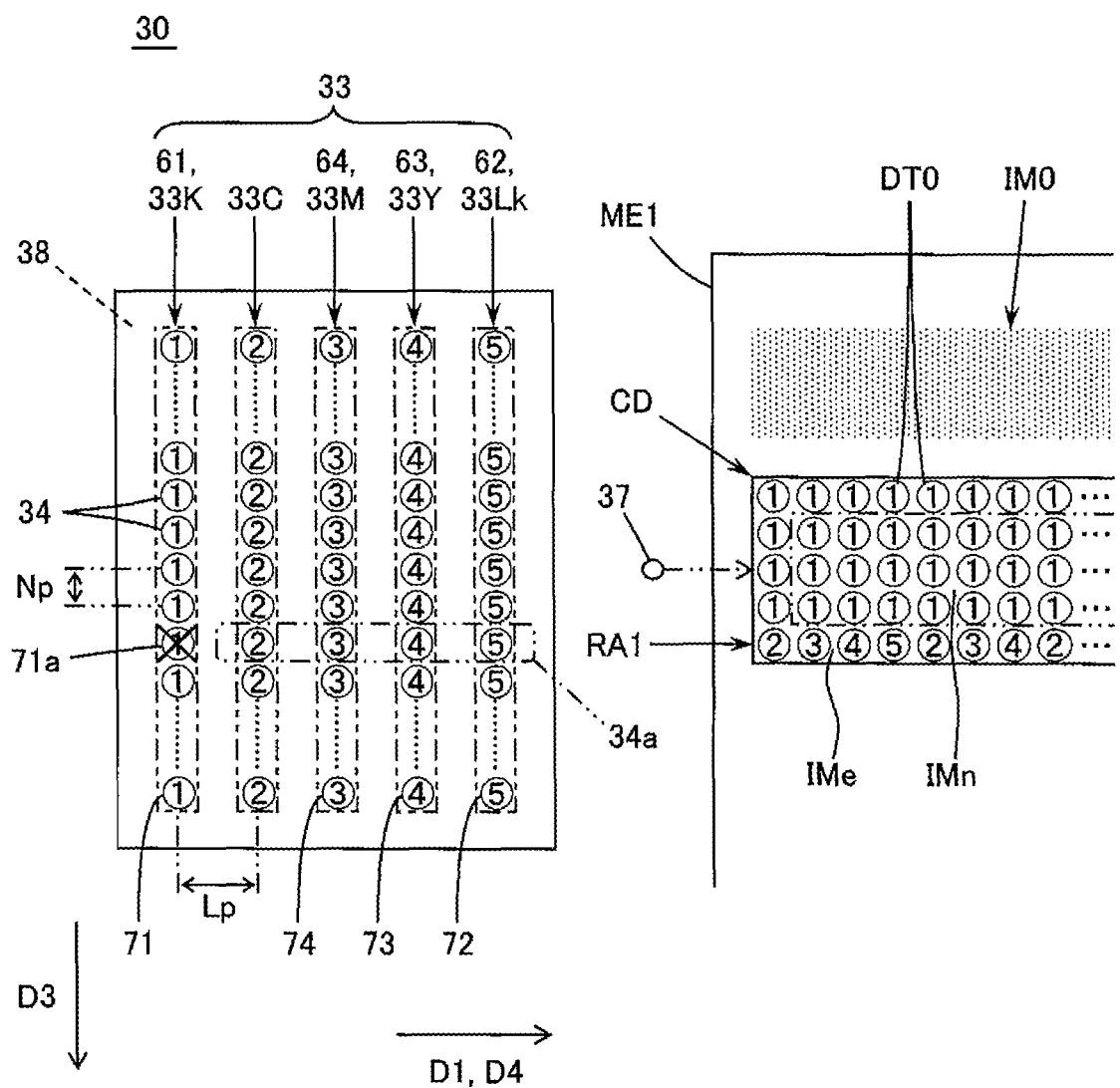
FIG. 3 is a drawing schematically illustrating an example of a correspondence between a nozzle row and an output image.

As exemplified in FIGS. 1 to 3, a recording control device 1 according to an aspect of the present technology controls recording on a medium ME1 by a recording head 30 including a plurality of nozzle rows 33, and a relative movement of the recording head 30 and the medium ME1 in a relative movement direction D4 that intersects a nozzle alignment direction D3 of the nozzle row 33, and the recording control device 1 includes a first control section U1 and a second control section U2. Here, the plurality of nozzle rows 33 includes a first nozzle row 61 including a plurality of first nozzles 71 for discharging first ink, a second nozzle row 62 including a plurality of second nozzles 72 for discharging second ink, and a third nozzle row 63 including a plurality of third nozzles 73 for discharging third ink. The third nozzle row 63 is provided between the first nozzle row 61 and the second nozzle row 62 in the relative movement direction D4.

For example, as illustrated in FIG. 3, the plurality of nozzle rows 33 of the recording head 30 includes a K nozzle row 33K including a plurality of K nozzles for discharging K (black) ink, a C nozzle row 33C including a plurality of C nozzles for discharging C (cyan) ink, an M nozzle row 33M including a plurality of M nozzles for discharging M (magenta) ink, a Y nozzle row 33Y including a plurality of Y nozzles for discharging Y (yellow) ink, and an Lk nozzle row 33Lk including a plurality of Lk nozzles for discharging Lk (light black) ink. Lk is an achromatic color lighter than K. The Lk nozzle row 33Lk is a nozzle row farthest from the K nozzle row 33K in the relative movement direction D4. The Y nozzle row 33Y is a nozzle row second farthest from the K nozzle row 33K in the relative movement direction D4. The M nozzle row 33M is a nozzle row third farthest from the K nozzle row 33K in the relative movement direction D4.

In the above-mentioned case, the K ink is an example of first ink, the K nozzle is an example of the first nozzle 71, the K nozzle row 33K is an example of the first nozzle row 61, the Lk ink is an example of second ink, the Lk nozzle is an example of the second nozzle 72, the Lk nozzle row 33Lk is an example of the second nozzle row 62, the Y ink is an example of third ink, the Y nozzle is an example of a third nozzle 73, and the Y nozzle row 33Y is an example of the third nozzle row 63. The second ink is different from the first ink. The third ink is different from the second ink and the third ink. Note that which of the plurality of nozzle rows included in the recording head 30 corresponds to the first nozzle row, the second nozzle row, and the third nozzle row is determined relative to each other. Accordingly, for example, the M nozzle row 33M or the C nozzle row 33C may correspond to the third nozzle row.

The first control section U1 forms an edge portion IMe of the output image IM0 formed on the medium ME1. The second control section U2 forms a non-edge portion IMn of the output image IM0. In the case where the first ink to be discharged from the first nozzle 71 is replaced at least by the second ink to be discharged from the second nozzle 72 and the third ink to be discharged from the third nozzle 73, the first control section U1 forms the edge portion IMe such that a first use rate R1, which is the use rate of the second nozzle 72 in the edge portion IMe, is lower than a second use rate R2, which is the use rate of the second nozzle 72 in the non-edge portion IMn.

When normal dots are not formed by the first nozzle 71, and/or information about the color corresponding to the first ink is replaced by other color information by resolution conversion, the first ink to be discharged from the first nozzle 71 may be replaced at least by the second ink to be discharged from the second nozzle 72 and the third ink to be discharged from the third nozzle 73. Here, in the case where the recording head 30 has an inclination error in a direction of rotation along a nozzle surface 38, the misalignment of the second nozzle 72 with respect to the first nozzle 71 is larger than the misalignment of the third nozzle 73 with respect to the first nozzle 71 in the nozzle alignment direction D3. Consequently, in the case where the rate of replacement by the third ink is high, widening of the edge portion IMe becomes conspicuous.

In the above-mentioned aspect of the present technology, in the case where the first ink is replaced by at least by the second ink and the third ink, the first use rate R1, which is the use rate of the second nozzle 72 in the edge portion IMe, is lower than the second use rate R2, which is the use rate of the second nozzle 72 in the non-edge portion IMn. In this manner, the conspicuity of widening of the edge portion IMe due to the recording head 30 with an inclination error is suppressed. Thus, the above-mentioned aspect can provide a recording control device that suppresses the reduction in the image quality at the edge portion.

In particular, in the case where a recording material including a bar code is scanned and then copied, the data may become half-tone data in the edge portion IMe of the barcode due to ink bleeding or low scanning resolution. Ink replacement occurs due to the change to the half-tone data, but even in this case, the conspicuity of widening of the edge portion IMe due to the recording head 30 with an inclination error is suppressed.

Here, the relative movement of the recording head and the medium includes movement of the medium with no movement of the recording head, movement of the recording head with no movement of the medium, and movement of both the recording head and the medium.

The relative movement direction may be orthogonal to the nozzle alignment direction, or may obliquely intersect the nozzle alignment direction without being orthogonal to the nozzle alignment direction.

In the subject application the "first", "second", "third" are the terms used to identify each component in a plurality of components with similarities, and do not mean any order. Which of a plurality of components corresponds to "first", "second", "third" . . . is determined relative to each other.

Note that the above-described notes apply also to the following aspects.

Second Aspect

As exemplified in FIGS. 1 to 3 and the like, the recording head 30 may include the nozzle surface 38 in which a nozzle 34 included in the plurality of nozzle rows 33 is disposed. As exemplified in FIGS. 11 and 12, in the case where an inclination θ of the recording head 30 in a direction of rotation along the nozzle surface 38 is a second inclination θ2*greater* than a first inclination θ1, the first control section U1 may set the first use rate R1 to a lower value than when the inclination θ is the first inclination θ1. As the inclination θ of the recording head 30 increases, the misalignment of the second nozzle 72 with respect to the first nozzle 71 in the nozzle alignment direction D3 increases. In the present aspect, in the case where the inclination θ of the recording head 30 is the second inclination θ2*greater* than the first inclination θ1, the first use rate R1, which is the use rate of the second nozzle 72 in the edge portion IMe, is lower than when the inclination θ of the recording head 30 is the first inclination θ1. In this manner, the conspicuity of widening of the edge portion IMe is suppressed in the case where the inclination θ of the recording head 30 is the second inclination θ2*greater* than the first inclination θ1. Thus, the present aspect can provide a suitable example that suppresses reduction in the image quality in an edge portion.

Third Aspect

Figure 4:
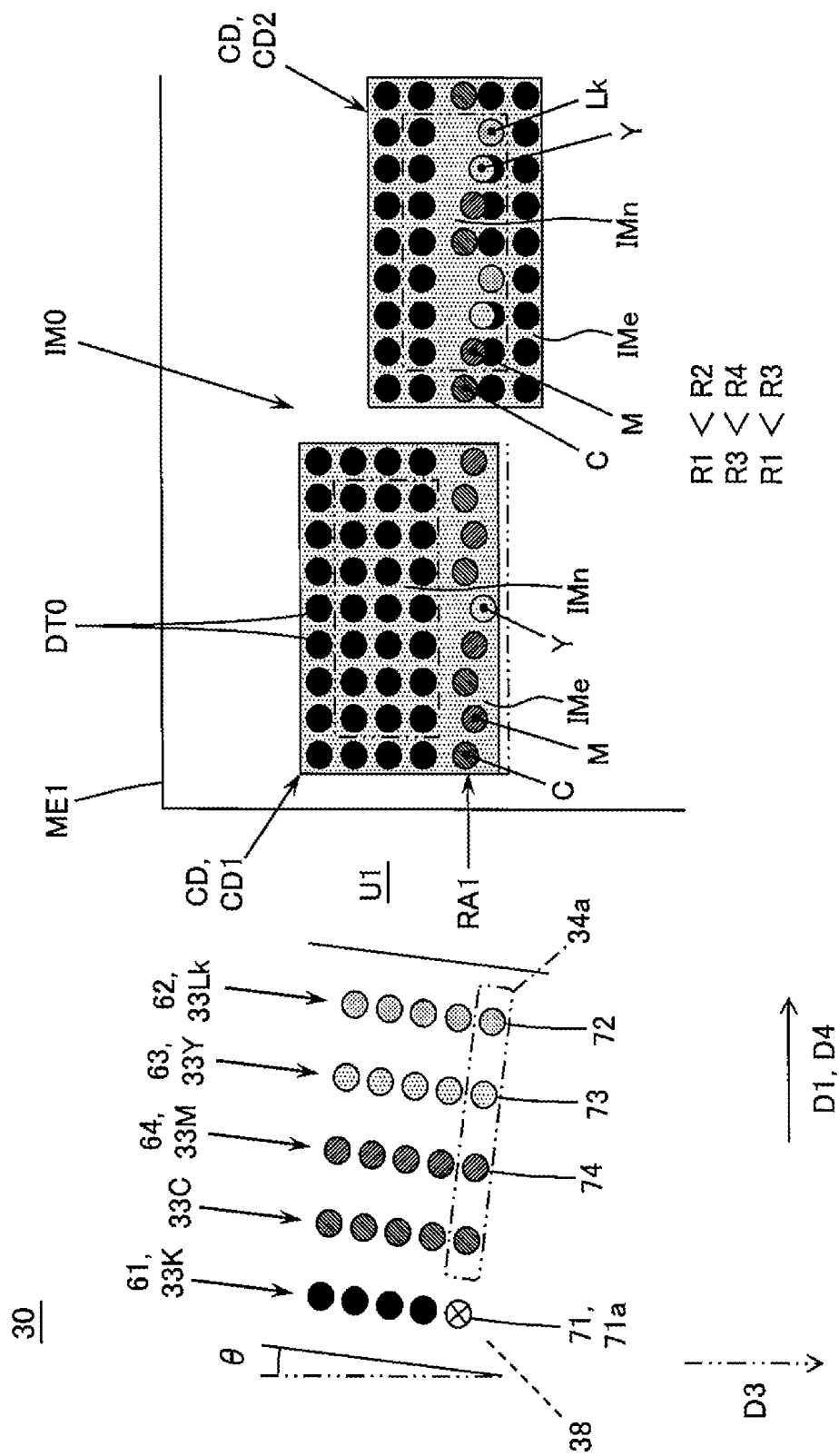
FIG. 4 is a drawing schematically illustrating an example of an output image that is formed in a case where composite complementation is performed with a recording head tilted in a direction of rotation along a nozzle surface.

As exemplified in FIG. 4, the first control section U1 may form the edge portion IMe without using the second nozzle 72. In this aspect, the second nozzle 72 is not used in the edge portion IMe in the case where the first ink is replaced by at least by the second ink and the third ink. In this manner, the conspicuity of widening of the edge portion IMe due to the recording head 30 with an inclination error is further suppressed. Thus, the present aspect can further suppress reduction in the image quality in an edge portion.

Fourth Aspect

As exemplified in FIGS. 3 and 4 and the like, the output image IM0 may include a code image CD. The extent of each part is important for the code image CD, and as such reading by a reading device may not be properly performed if the edge portion IMe is widened. In view of this, the present aspect can form an output image including a code image that can be properly read, on a medium.

Here, the code image CD includes a bar code, a quick response (QR) code, which is a matrix two-dimensional code, and the like. This note applies also to the following aspects.

Fifth Aspect

As exemplified in FIGS. 1 to 3 and the like, the plurality of nozzle rows 33 may further include a fourth nozzle row 64 including a plurality of fourth nozzles 74 for discharging fourth ink. In the relative movement direction D4, the fourth nozzle row 64 may be provided between the first nozzle row 61 and the third nozzle row 63. In the example illustrated in FIG. 3, the M ink is an example of the fourth ink, the M nozzle is an example of the fourth nozzle 74, and the M nozzle row 33M is an example of the fourth nozzle row 64. The fourth ink is different from the first ink, the second ink, and the third ink. Note that which of the plurality of nozzle rows included in the recording head 30 corresponds to the first nozzle row, the second nozzle row, the third nozzle row, and the fourth nozzle row is determined relative to each other. As such, for example, the C nozzle row 33C may correspond to the fourth nozzle row.

In the case where the first ink to be discharged from the first nozzle 71 is replaced at least by the second ink to be discharged from the second nozzle 72, the third ink to be discharged from the third nozzle 73, and the fourth ink to be discharged from the fourth nozzle 74, the first control section U1 may form the edge portion IMe such that a third use rate R3, which is the use rate of the third nozzle 73 in the edge portion IMe, is lower than a fourth use rate R4, which is the use rate of the third nozzle 73 in the non-edge portion IMn.

When normal dots are not formed by the first nozzle 71, and/or information about the color corresponding to the first ink is replaced by other color information by resolution conversion, the first ink to be discharged from the first nozzle 71 may be replaced at least by the second ink to be discharged from the second nozzle 72, the third ink to be discharged from the third nozzle 73, and the fourth ink to be discharged from the fourth nozzle 74. Here, in the case where the recording head 30 has an inclination error in a direction of rotation along the nozzle surface 38, the misalignment of the third nozzle 73 with respect to the first nozzle 71 is greater than the misalignment of the fourth nozzle 74 with respect to the first nozzle 71 in the nozzle alignment direction D3. Consequently, in the case where the rate of replacement by the third ink is high, widening of the edge portion IMe becomes conspicuous.

In the above-mentioned aspect of the present technology, in the case where the first ink is replaced at least by the second ink, the third ink and the fourth ink, the third use rate R3, which is the use rate of the third nozzle 73 in the edge portion IMe, is lower than the fourth use rate R4, which is the use rate of the third nozzle 73 in the non-edge portion IMn. In this manner, the conspicuity of widening of the edge portion IMe due to the recording head 30 with an inclination error is further suppressed. Thus, the above-mentioned aspect can further suppress reduction in the image quality in an edge portion.

Sixth Aspect

As exemplified in FIG. 10 and the like, in the case where the first ink to be discharged from the first nozzle 71 is replaced at least by the second ink to be discharged from the second nozzle 72, the third ink to be discharged from the third nozzle 73, and the fourth ink to be discharged from the fourth nozzle 74, the first control section U1 may form the edge portion IMe such that the first use rate R1 is lower than the third use rate R3. When, in the edge portion IMe, the first use rate R1, which is the use rate of the second nozzle 72, is lower than the third use rate R3, which is the use rate of the third nozzle 73, the conspicuity of widening of the edge portion IMe due to the recording head 30 with an inclination error is further suppressed. Thus, the present aspect can further suppress reduction in the image quality in an edge portion.

Seventh Aspect

Incidentally, in the case where the first ink to be discharged from the first nozzle 71 is replaced at least by the second ink to be discharged from the second nozzle 72 and the third ink to be discharged from the third nozzle 73, a recording control method according to an aspect of the present technology forms the output image IM0 such that the first use rate R1, which is the use rate of the second nozzle 72 in the edge portion IMe of output image IM0 formed on the medium ME1, is lower than the second use rate R2, which is the use rate of the second nozzle 72 in the non-edge portion IMn in the output image IM0. The present aspect can provide a recording control method that suppresses reduction in the image quality in an edge portion.

Further, the present technology is applicable to a recording system including the above-described recording control device, a control method of the recording system, a recording control program, a control program of the above-described recording system, a computer-readable medium in which any of the above-described control programs is recorded, and the like. In addition, the above-described recording control device may be composed of a plurality of separate parts.

2. SPECIFIC EXAMPLES OF RECORDING SYSTEM INCLUDING RECORDING CONTROL DEVICE

FIG. 1 schematically exemplifies a recording system SY1 including the recording control device 1. The recording system SY1 illustrated in FIG. 1 includes a host device 100 and a recording device 2. While the host device 100 includes the recording control device 1 in the example illustrated in FIG. 1, the recording control device may be included in the recording device 2, or may be included in both the recording device 2 and the host device 100. Note that the recording system SY1 may include an additional element not illustrated in FIG. 1, and the host device 100 may include an additional element not illustrated in FIG. 1.

The host device 100 is connected to a CPU 111, a ROM 112, a RAM 113, a storage device 114, an input device 115, a display device 116, a communication I/F 117, and the like such that information can be mutually exchanged. Here, CPU is an abbreviation for Central Processing Unit, ROM is an abbreviation for Read Only Memory, RAM is an abbreviation for Random Access Memory, and I/F is an abbreviation for interface. The ROM 112, the RAM 113 and the storage device 114 are memories, and at least the ROM 112 and the RAM 113 are semiconductor memories.

The storage device 114 stores an OS not illustrated, a recording control program PR0, the inclination θ of the recording head 30, and the like. They are appropriately read in the RAM 113, and used for a recording control process. Here, OS is an abbreviation for operating system. As the storage device 114, a nonvolatile semiconductor memory such as a flash memory, a magnetic storage device such as hard disk and the like may be used.

As the input device 115, a pointing device, a hard key including a keyboard, a touch panel bonded on a surface of a display panel, and the like may be used. As the display device 116, a liquid crystal display panel and the like may be used. The communication I/F 117, which is connected to a communication I/F 22 of the recording device 2, inputs/outputs information such as nozzle data DA4 to/from the recording device 2. The communication scheme of the communication I/Fs 117 and 22 may be wired communication, radio communication, or network communication such as Local Area Network and the Internet.

Figure 7:
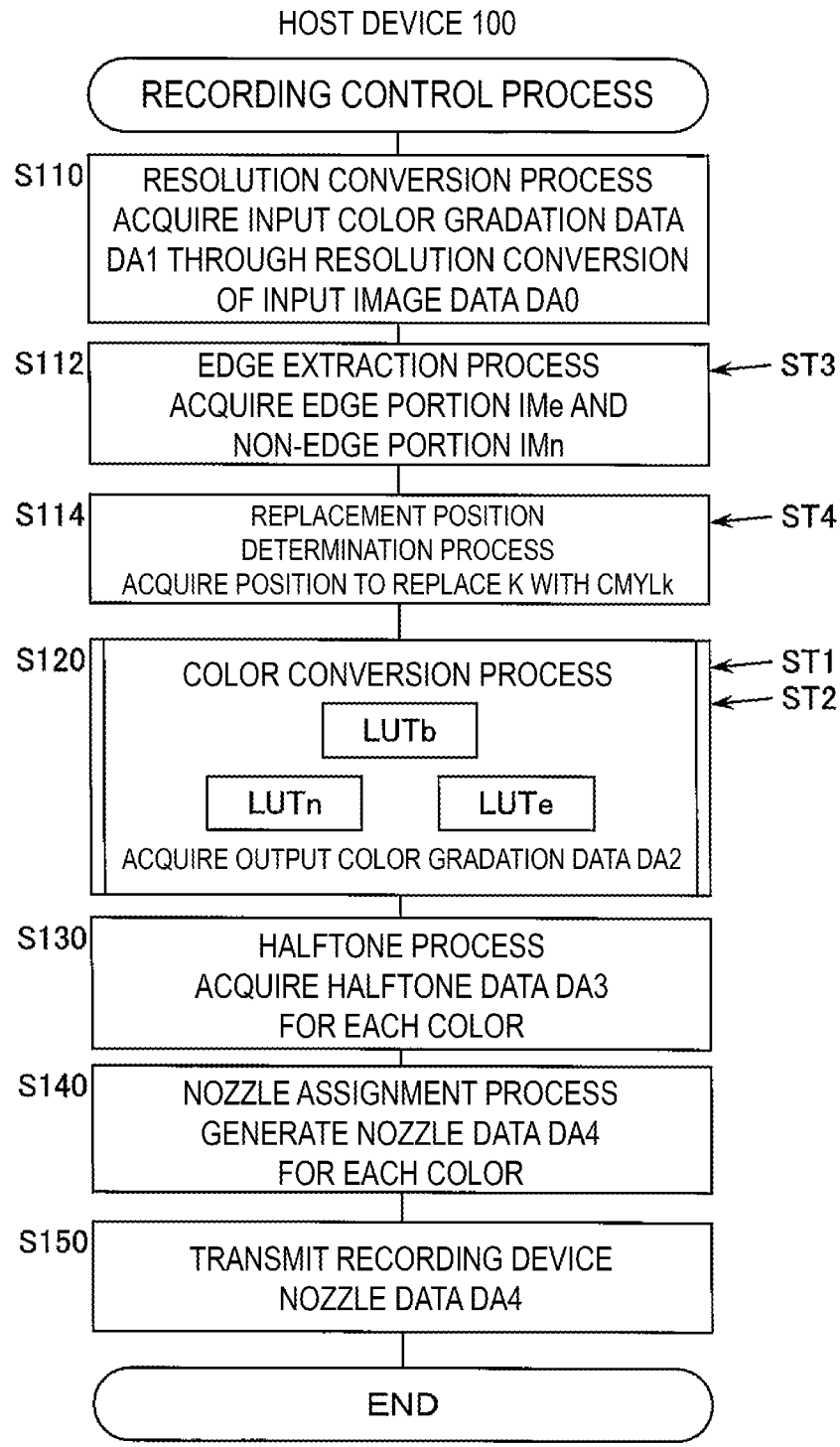
FIG. 7 is a flowchart of an example of a recording control process.

The recording control program PR0 causes the host device 100 to implement a resolution conversion function 121 including an edge extraction function 122, a replacement position determination function 123, a color conversion function 124, a halftone process function 125, and a nozzle assignment function 126. The CPU 111 performs various processes by appropriately reading information stored in the storage device 114 in the RAM 113 and executing the read program. The CPU 111 performs processes corresponding to the above-described functions 121 to 126 by executing the recording control program PR0 read in the RAM 113. The recording control program PR0 causes the host device 100, which is a computer, to function as the first control section U1, the second control section U2, an edge extraction section U3 corresponding to the edge extraction function 122, and a replacement position specifying section U4 corresponding to the replacement position determination function 123. With reference also to FIG. 7, the host device 100 that executes the recording control program PR0 implements a first control step ST1 corresponding to the first control section U1, a second control step ST2 corresponding to the second control section U2, an edge extraction step ST3 corresponding to the edge extraction section U3, and a replacement position identification step ST4 corresponding to the replacement position specifying section U4. The computer-readable medium storing the recording control program PR0 is not limited to a storage device inside a host device, and may be a recording medium provided outside the host device.

The resolution conversion function 121 converts the resolution of input image data DA0 into a set resolution. The input image data DA0 is represented, for example, by original RGB data with multi-gradation integer values of R, G, and B for each pixel. Here, R means red, G means green, and B means blue. The resolution conversion function 121 converts original RGB data into input color gradation data DA1 of a set resolution. The input color gradation data DA1 is represented, for example, by RGB data with multi-gradation integer values of R, G, and B for each pixel. The number of gradations of the RGB data and the original RGB data is $2^8$, $2^{16}$ and the like.

On the basis of the image data corresponding to the output image IM0 such as any of data DA0 to DA4, the edge extraction function 122 extracts an edge portion in the output image IM0 such as a code image such as a bar code, a letter, and a line drawing. In the output image IM0 exemplified in FIG. 3, the edge portion IMe is present along the boundary of the code image CD such as a bar code. In the output image IM0, the portion excluding the edge portion IMe is the non-edge portion IMn.

The replacement position determination function 123 determines a replacement position for replacing ink to be discharged from a certain nozzle, such as a defective nozzle 71a illustrated in FIG. 3, with ink to be discharged from a plurality of alternative nozzles 34a. The plurality of alternative nozzles 34a are nozzles that discharge an ink drop 37 to a scan line RA1 extending along the relative movement direction D4 and passing through the position of the defective nozzle 71a. In the set resolution data DA1 to DA4, replacement positions are represented by positions of pixels.

The color conversion function 124 converts the input color gradation data DA1 into output color gradation data DA2 that has multi-gradation integer values of C, M, Y, K, and Lk for each pixel with reference to a color conversion look-up table that defines the correspondence between each gradation value of R, G, and B and each gradation value of C, M, Y, K, and Lk, for example. The color conversion look-up table includes a base color conversion table LUTb that is referred to for the portion excluding the replacement position in the input color gradation data DA1, a non-edge portion color conversion table LUTn that is referred to for the non-edge portion IMn in the replacement position, and an edge portion color conversion table LUTe that is referred to for the edge portion IMe in the replacement position. The number of gradations of the output color gradation data DA2 is $2^8$, $2^{16}$ and the like. The output color gradation data DA2 represents the usage of ink 36 for each pixel.

The halftone process function 125 generates halftone data DA3 by reducing the number of gradations of the gradation value by performing a predetermined halftone process such as a dither method, an error diffusion method and a density pattern method for the gradation value of each pixel that constitutes the output color gradation data DA2. The halftone data DA3 represents a dot formation state. The halftone data DA3 may be binary data that represents whether to form dots, multi-level data of three or more levels that can be used for different sizes of dots, such as small, medium, and large dots. Binary data may be data in which 1 corresponds to dot formation and 0 to no dot formation, for example. Four-valued data that can express each pixel in two bits may be data in which 3 corresponds to large dot formation, 2 to medium dot formation, 1 to small dot formation, and 0 to no dot, for example.

The nozzle assignment function 126 generates the nozzle data DA4 by performing a nozzle assignment process of sorting the halftone data DA3 in the order of the dot formation at a driving section 50 of the recording device 2 exemplified in FIG. 2. A nozzle assignment process for a serial printer is also called a rasterization process.

Note that the color conversion function 124 that performs color conversion in accordance with the edge portion color conversion table LUTe, the halftone process function 125, and the nozzle assignment function 126 correspond to the first control section U1. The color conversion function 124 that performs color conversion in accordance with the non-edge portion color conversion table LUTn, the halftone process function 125, and the nozzle assignment function 126 correspond to the second control section U2.

The host device 100 includes a computer such as a personal computer including a tablet-type terminal, a mobile phone such as a smartphone, a digital camera, and a digital video camcorder and the like. In addition, the host device 100 may include the above-described components 111 to 117 in a single housing, or may be composed of a plurality of communicably separated devices. Further, the present technology can be implemented even in the case where at least a part of the recording device 2 is provided in the host device 100.

The recording device 2 is an ink-jet printer that forms the output image IM0 corresponding to the nozzle data DA4 by discharging the ink drop 37 to the medium ME1 from the nozzle 34 arranged in the nozzle surface 38 of the recording head 30. The nozzle surface 38 faces the medium ME1 at the recording head 30. Thus, when the recording head 30 discharges the ink drop 37 from a normal nozzle 34, ink dots are formed on the medium ME1 by the ink drop 37 impinging on the medium ME1. The printed output image IM0 is a collection of ink dots on the medium ME1.

FIG. 2 illustrates a serial printer, which is a type of ink-jet printer, as the recording device 2. The recording device 2 includes a controller 10, a nonvolatile memory 20, a RAM 21, a communication I/F 22, the recording head 30, a defective nozzle detection section 40, the driving section 50, and the like. The controller 10, the nonvolatile memory 20, the RAM 21, and the communication I/F 22 are connected to a bus, and can mutually exchange information. When receiving the nozzle data DA4 from the host device 100, the recording device 2 controls the recording on the medium ME1 by the recording head 30 and the relative movement of the recording head 30 and the medium ME1 by the driving section 50 in accordance with the nozzle data DA4. In addition, the recording device 2 can receive the input image data DA0 illustrated in FIG. 1 from the host device 100. In this case, the controller 10 of the recording device 2 generates the nozzle data DA4 on the basis of the input image data DA0, and controls the recording on the medium ME1 by the recording head 30 and the relative movement of the recording head 30 and the medium ME1 by the driving section 50 in accordance with the nozzle data DA4.

The controller 10 includes a CPU 11, a resolution conversion section 12, a color conversion section 13, a halftone processing section 14, a nozzle assignment section 15, a driving signal transmission section 16, and the like. The controller 10 controls main scanning and sub scanning by the driving section 50 and discharging of the ink drop 37 by the recording head 30 on the basis of image data corresponding to the output image IM0. The main scanning means a relative movement of the recording head 30 and the medium ME1 in the main scanning direction, the sub scanning means a relative movement of the recording head 30 and the medium ME1 in a sending direction D2, and the discharging of the ink drop 37 by the recording head 30 means recording on the medium ME1 by the recording head 30. The controller 10 may be composed of an SoC or the like. SoC is an abbreviation for System on a Chip.

The CPU 11 is a device that mainly performs information processing and control in the recording device 2.

The resolution conversion section 12 can convert the resolution of the input image data DA0 from the host device 100 and the like into a set resolution. The color conversion section 13 can convert the input color gradation data DA1 into the output color gradation data DA2 that has multi-gradation integer values of C, M, Y, K, and Lk for each pixel. The halftone processing section 14 can generate the halftone data DA3 on the basis of the output color gradation data DA2. The nozzle assignment section 15 can generate the nozzle data DA4 by performing the nozzle assignment process of sorting the halftone data DA3.

The driving signal transmission section 16 generates, from the nozzle data DA4, a driving signal SG corresponding to a voltage signal to be applied to a driving element 32 of the recording head 30, and outputs it to a driving circuit 31. For example, when the nozzle data DA4 is "dot formation", the driving signal transmission section 16 outputs a driving signal for discharging droplets for dot formation. In addition, in the case where the nozzle data DA4 is four-valued data, the driving signal transmission section 16 outputs a driving signal for discharging droplets for large dots when the nozzle data DA4 is "large dot formation", outputs a driving signal for discharging droplets for medium dots when the nozzle data DA4 is "medium dot formation", and outputs a driving signal for discharging droplets for small dots when the nozzle data DA4 is "small dot formation".

Each of the above-mentioned parts 11 to 16 may be composed of an ASIC, may directly read data to be processed from the RAM 21, and may directly write processed data in the RAM 21. Here, ASIC is an abbreviation for Application Specific Integrated Circuit.

The driving section 50 that is controlled by the controller 10 includes a carriage driving section 51, a carriage 52, a roller driving section 55, a conveyance roller pair 56, a sheet ejection roller pair 57, a platen 58, and the like. The driving section 50 moves the carriage 52 and the recording head 30 back and forth through driving of the carriage driving section 51, and sends the medium ME1 along a conveyance path 59 in the sending direction D2 through driving of the roller driving section 55. In FIG. 2, the sending direction D2 is the right direction, and the left side and right side are referred to as the upstream side and downstream side, respectively. Under the control of the controller 10, the carriage driving section 51 performs a main scanning for moving the carriage 52 and the recording head 30 in a main scanning direction D1 illustrated in FIG. 3 and the like. The roller driving section 55 performs a sub scanning for sending the medium ME1 in the sending direction D2 by rotating rollers 56a and 57a of the roller pairs 56 and 57 under the control of the controller 10. The medium ME1 is a material that retains a printing image, and may be resin, metal, and the like while it is typically paper. While the shape of the medium ME1 is typically a rectangular shape or a roll shape, the shape may be an ellipse shape, a polygonal shape other than a rectangular shape, a three-dimensional shape, or the like.

The recording head 30 is mounted in the carriage 52. In the carriage 52, an ink cartridge 35 for supplying the recording head 30 with the ink 36 to be discharged as the ink drop 37. Naturally, the ink 36 may be supplied to the recording head 30 through a tube from the ink cartridge 35 installed outside the carriage 52. The carriage 52 in which the recording head 30 is mounted is fixed to an endless belt not illustrated in the drawings, and can move back and force along a guide 53 along the main scanning direction D1 illustrated in FIG. 3 and the like. The guide 53 is a long member whose longitudinal direction is set to the main scanning direction D1. The carriage driving section 51 is composed of a servomotor, and moves the carriage 52 in the forward direction and backward direction in accordance with a command from the controller 10.

The conveyance roller pair 56 located upstream of the recording head 30 includes a drive conveyance roller 56a that makes contact with one surface of the medium ME1, and a driven conveyance roller 56b that makes contact with the other surface of the medium ME1. In the sub scanning, the conveyance roller pair 56 sends the medium ME1 nipped therebetween toward the recording head 30 through rotation of the drive conveyance roller 56a.

The sheet ejection roller pair 57 located downstream of the recording head 30 includes a drive sheet ejection roller 57a that makes contact with one surface of the medium ME1, and a driven sheet ejection roller 57b that makes contact with the other surface of the medium ME1. In the sub scanning, the sheet ejection roller pair 57 conveys the medium ME1 nipped therebetween toward a sheet tray not illustrated in the drawing through rotation of the drive sheet ejection roller 57a.

The roller driving section 55 is composed of a servomotor, and rotates the rollers 56a and 57a in accordance with a command from the controller 10. The rollers 56a and 57a send the medium ME1 in the sending direction D2 through rotation.

The platen 58 supports the medium ME1 located on the conveyance path 59. The recording head 30 controlled by the controller 10 performs printing by discharging the ink drop 37 to the medium ME1 supported by the platen 58. The recording head 30 includes the driving circuit 31, the driving element 32, and the like. The driving circuit 31 applies a voltage signal to the driving element 32 in accordance with the driving signal SG input from the driving signal transmission section 16. As the driving element 32, a piezoelectric element that pressurize the ink 36 in a pressure chamber communicated with the nozzle 34, a driving element that generates bubbles in the pressure chamber using heat and discharges the ink drop 37 from the nozzle 34, and the like may be used. The nozzle is a small hole for jetting ink drops. The ink 36 is supplied to the pressure chamber of the recording head 30 from the ink cartridge 35. The combination of the ink cartridge 35 and the recording head 30 is provided for each of C, M, Y, K and Lk, for example. The ink 36 in the pressure chamber is discharged as the ink drop 37 by the driving element 32 from the nozzle 34 toward the medium ME1. In this manner, dots of the ink drop 37 are formed on the medium ME1. Dots corresponding to the nozzle data DA4 are formed while the recording head 30 moves in the main scanning direction D1, and the output image IM0 is formed on the medium ME1 by repeating sending of the medium ME1 in the conveyance direction for a single sub scanning.

The nonvolatile memory 20 stores the inclination θ of the recording head 30 and the like. As the nonvolatile memory 20, a nonvolatile semiconductor memory such as flash memory, a magnetic storage device such as a hard disk, and the like may be used. The RAM 21 is a volatile semiconductor memory with a large-capacity, and stores an input image and the like received from the host device 100, a memory not illustrated in the drawing and/or the like. The communication I/F 22 inputs/outputs information to/from the host device 100.

As the recording device, there is a line-type recording device, such as a line printer, in which a long recording head disposed over the entire width of the medium ME1 and the medium ME1 relatively move in the sending direction D2. In the line printer, the recording head does not move, and recording is performed while the medium ME1 moves in the sending direction D2.

FIG. 3 schematically exemplifies a correspondence between the nozzle row 33 and the output image IM0. For convenience, each K nozzle of the K nozzle row 33K is indicated with circle 1, each C nozzle of the C nozzle row 33C is indicated with circle 2, each M nozzle of the M nozzle row 33M is indicated with circle 3, each Y nozzle of the Y nozzle row 33Y is indicated with circle 4, and each Lk nozzle of the Lk nozzle row 33Lk is indicated with circle 5. In addition, a dot DT0 formed on the medium ME1 by the ink drop 37 discharged from the K nozzle is indicated with circle 1, the dot DT0 formed on the medium ME1 by the ink drop 37 discharged from the C nozzle is indicated with circle 2, the dot DT0 formed on the medium ME1 by the ink drop 37 discharged from the M nozzle is indicated with circle 3, the dot DT0 formed on the medium ME1 by the ink drop 37 discharged from the Y nozzle is indicated with circle 4, and the dot DT0 formed on the medium ME1 by the ink drop 37 discharged from the Lk nozzle is indicated with circle 5. The nozzle surface 38 of the recording head 30 is located on the depth side in FIG. 3. Accordingly, the nozzles 34 of all nozzle rows 33 are located on the depth side in FIG. 3.

The recording head 30 illustrated in FIG. 3 may be used for a line-type recording device, or may be applied to a serial-type recording device, such as a serial printer, that repeats the main scanning and the sub scanning. A serial printer repeats the main scanning for moving the recording head 30 in the main scanning direction D1 and the sub scanning for moving the medium ME1 in the sending direction D2. In the case of a serial-type recording device, the main scanning direction D1 is the relative movement direction D4 in which the recording head 30 and the medium ME1 relatively move.

The plurality of the nozzles 34 of each nozzle row 33 are disposed side by side at an even interval of a nozzle pitch Np in the nozzle alignment direction D3. The nozzle alignment direction D3 and the relative movement direction D4 may be orthogonal to each other or may be obliquely intersect each other without being orthogonal to each other. In a case of a serial-type recording device, the nozzle alignment direction D3 may be aligned with the sending direction D2 illustrated in FIG. 2, or may be misaligned from the sending direction D2 within a range smaller than 90° from the sending direction D2. In addition, while the plurality of the nozzles 34 included in the nozzle row 33 illustrated in FIG. 3 is arranged in a line, a plurality of nozzles included in the nozzle row may be arranged in a staggered manner.

In design, the plurality of nozzle rows 33 of the recording head 30 is disposed side by side at an even interval of a nozzle row pitch Lp in the relative movement direction D4.

The code image CD formed on the medium ME1 illustrated in FIG. 3 is a bar code whose longitudinal direction of the strong color portion is set to the relative movement direction D4. Naturally, the code image CD is not limited to a bar code representing one-dimensional information, and may be a QR code representing two-dimensional information and the like. The detection device for the code image CD often uses red-light emitting diodes, and therefore the code image CD is often formed with black and/or blue. The code image CD illustrated in FIG. 3 is black. When the K nozzle included in the K nozzle row 33K is normal, the code image CD is formed of a collection of K dots (circle 1) resulting from the ink drop 37 discharged from the K nozzle.

In the case where a certain K nozzle cannot normally discharge ink drops due to clogging or the like, a "dot missing" region where pixels whose dot DT0 is not formed are continued in the relative movement direction D4 is formed, and a base color streak such as a white streak is formed in the output image IM0. Here, the K nozzle that cannot normally discharge ink drops is referred to as the defective nozzle 71a. The alternative nozzle 34a that can discharge the ink drop 37 to the scan line RA1 that passes through the defective nozzle 71a along the relative movement direction D4 is present in the C nozzle row 33C, the M nozzle row 33M, the Y nozzle row 33Y, and the Lk nozzle row 33Lk. As such, composite complementation for replacing the K ink to be discharged from the defective nozzle 71a with ink to be discharged from the alternative nozzles 34a of C, M, Y and Lk is performed. Through the composite complementation, the K dot to be formed by the defective nozzle 71a is replaced by the dot DT0 of C, M, Y and Lk to be formed by the plurality of alternative nozzles 34a. In this manner, a base color streak such as a white streak is avoided, and reduction in the image quality of the code image CD is suppressed.

Note that the composite complementation is not limited to the method of selectively forming the dot DT0 of C, M, Y and Lk for each pixel located on the scan line RA1 as illustrated in FIG. 3, and may be a method of overlaying dots of a plurality of colors at one pixel.

Figure 15:
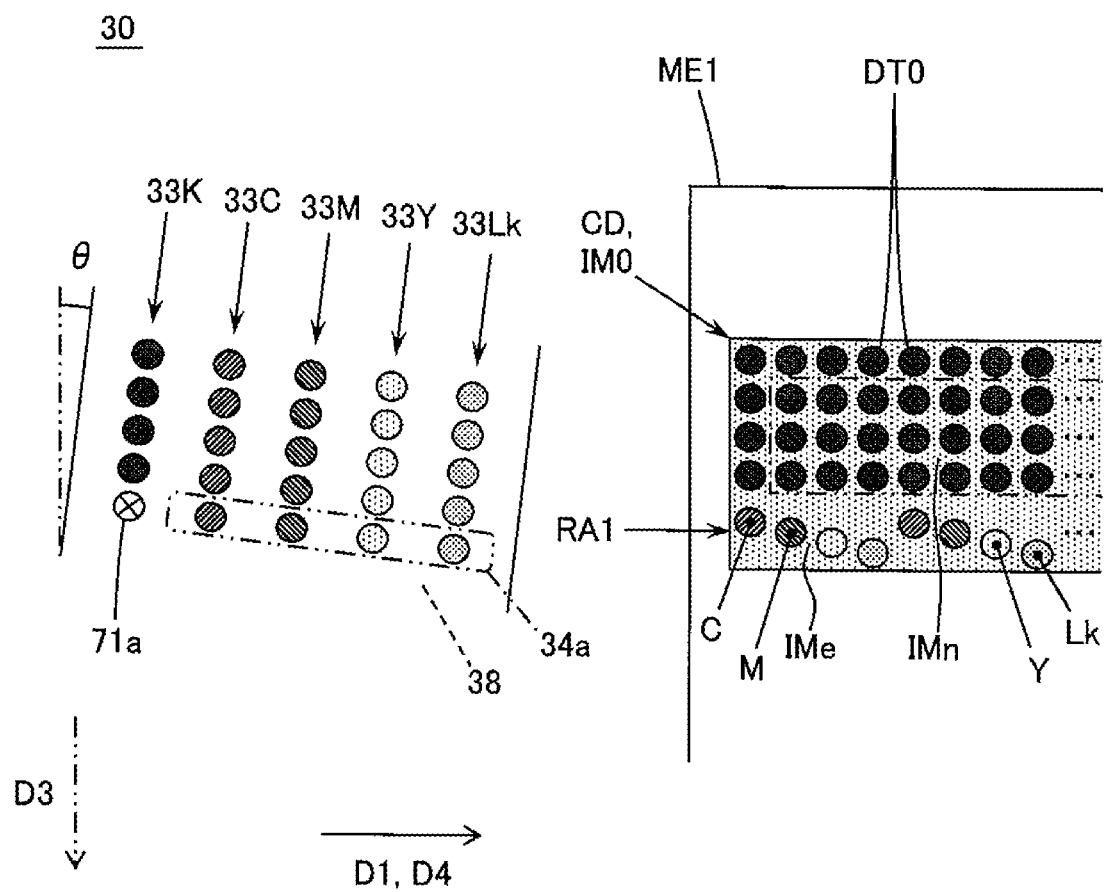
FIG. 15 is a drawing schematically illustrating an example of an output image that is formed in a case where composite complementation is performed with a recording head tilted in a direction of rotation along a nozzle surface in a comparative example.

As exemplified in FIG. 15, the recording head 30 attached to the recording device 2 may have an inclination in a direction of rotation along the nozzle surface 38. The inclination θ of the recording head 30 in a direction of rotation along the nozzle surface 38 is an inclination angle with respect to the designed position. The inclination θ is a plus angle when it is tilted to the right side in FIG. 15, and is a minus angle when it is tilted to the left side in FIG. 15. FIG. 15 schematically exemplifies the output image IM0 that is formed when the composite complementation is performed with the recording head 30 tilted in a direction of rotation along the nozzle surface 38 in a comparative example. In FIG. 15, the dots DT0 are illustrated with no overlap to clearly illustrate the impinging position of the ink drop 37. In practice, the black code image CD is formed by the overlapping dots DT0. In addition, some dots DT0 are illustrated with dot colors.

In the case where the edge portion IMe of the code image CD is present along the scan line RA1 passing through the defective nozzle 71a of K, the dots of C, M, Y and Lk are formed in a spread manner in the nozzle alignment direction D3 intersecting the relative movement direction D4. The misalignment of the dot DT0 in the nozzle alignment direction D3 is present also in the dots of C formed by the alternative nozzle 34a of the C nozzle row 33C adjacent to the K nozzle row 33K. However, the misalignment of the dot DT0 increases with the increasing distance of the alternative nozzle 34a from the K nozzle row 33K in the order of the C dot, M dot, Y dot, and Lk dot. As a result, the edge portion IMe having been subjected to the composite complementation is lightly spread in the nozzle alignment direction D3. In particular, for a bar code, the thickness is an important factor, and therefore reading by a reading device may not be properly performed if the edge portion IMe is lightly spread.

In the present specific example, in the case where the K ink to be discharged from the K nozzle is replaced by the ink to be discharged from the nozzle of C, M, Y and Lk, the first use rate R1 of the Lk nozzle in the edge portion IMe is set to a rate lower than the second use rate R2 of the Lk nozzle in the non-edge portion IMn as exemplified in FIG. 4. In this manner, the conspicuity of widening of the edge portion IMe due to the recording head 30 with an inclination error is suppressed. In addition, in the present specific example, in the case where the K ink is replaced by C, M, Y and Lk, the third use rate R3 of the Y nozzle in the edge portion IMe is set to a rate lower than the fourth use rate R4 of the Y nozzle in the non-edge portion IMn. Further, in the present specific example, in the case where the K ink is replaced by C, M, Y and Lk, the first use rate R1 of the Lk nozzle in the edge portion IMe is set to a rate lower than the third use rate R3 of the Y nozzle in the edge portion IMe.

FIG. 4 schematically exemplifies the output image IM0 that is formed when the composite complementation is performed with the recording head 30 tilted in a direction of rotation along the nozzle surface 38. The inclination θ is a plus angle when it is tilted to the right side in FIG. 4, and is a minus angle when it is tilted to the left side in FIG. 4. In FIG. 4, the dots DT0 are illustrated with no overlap to clearly illustrate the impinging position of the ink drop 37. In practice, the black code image CD is formed by the overlapping dots DT0. In addition, some dots DT0 are illustrated with dot colors. Here, the K nozzle row 33K including the defective nozzle 71a is an example of the first nozzle row 61 including a plurality of the first nozzles 71, the Lk nozzle row 33Lk is an example of the second nozzle row 62 including a plurality of the second nozzles 72, the Y nozzle row 33Y is an example of the third nozzle row 63 including a plurality of the third nozzles 73, and the M nozzle row 33M is an example of the fourth nozzle row 64 including a plurality of the fourth nozzles 74.

The output image IM0 formed on the medium ME1 includes the code image CD1 in which the edge portion IMe is present along the scan line RA1 passing through the defective nozzle 71a of K, and the code image CD2 in which the edge portion IMe along the relative movement direction D4 does not pass through the scan line RA1. The composite complementation is performed for the scan line RA1 regardless of whether it is the code image CD1 or the code image CD2.

For the scan line RA1, the first control section U1 of the present specific example controls the first use rate R1 of the Lk nozzle in the edge portion IMe to a rate lower than the second use rate R2 of the Lk nozzle in the non-edge portion IMn. In the illustration of FIG. 4, no Lk dot is formed in the edge portion IMe located on the scan line RA1 in the code image CD1 whereas the Lk dot is present in the non-edge portion IMn located on the scan line RA1 in the code image CD2. In this manner, FIG. 4 illustrates R1=0 for the scan line RA1, i.e., an example where no Lk dot is formed by performing a control of not using the Lk nozzle in the edge portion IMe. In addition, FIG. 4 illustrates an example in which, for the scan line RA1, the Lk dot is formed by performing a control of using the Lk nozzle in the non-edge portion IMn. Note that in the case where the inclination angle of the recording head 30 is on the side opposite to the case illustrated in FIG. 4, i.e., in the case where the alternative nozzle 34a is located on the upper side of the defective nozzle 71a in FIG. 4, the edge portion IMe on the scan line RA1 is not widened in the example illustrated in FIG. 4. In the case where the scan line RA1 passing through the defective nozzle 71a is the edge portion IMe of the upper side of the code image CD, however, the edge portion IMe is widened when the Lk dot is formed, and therefore the widening of the edge portion IMe is suppressed by the present technology.

In addition, for the scan line RA1, the first control section U1 controls the third use rate R3 of the Y nozzle in the edge portion IMe to a rate lower than the fourth use rate R4 of the Y nozzle in the non-edge portion IMn. FIG. 4 illustrates an example in which, for the scan line RA1, the rate of the Y dot in the edge portion IMe is lower than the rate of the Y dot in the non-edge portion IMn. Also in this case, in the case where the scan line RA1 passing through the defective nozzle 71a is the edge portion IMe of the upper side of the code image CD, the edge portion IMe is widened when the Y dot is formed, and therefore the widening of the edge portion IMe is suppressed by the present technology.

Here, among a plurality of pixels included in the scan line RA1 in the output image IM0, the number of the pixels assigned to the Lk nozzle serving as the alternative nozzle 34a is represented by NLk, the number of pixels assigned to the Y nozzle serving as the alternative nozzle 34a by NY, the number of pixels assigned to the M nozzle serving as the alternative nozzle 34a by NM, and the number of pixels assigned to the C nozzle serving as the alternative nozzle 34a by NC. The use rates R1 and R2 of the Lk nozzle are represented by {NLk/(NLk+NY+NM+NC)}. In addition, the use rates R3 and R4 of the Y nozzle are represented by (NY/(NLk+NY+NM+NC)).

In general, among a plurality of pixels included in the scan line RA1 in the output image IM0, the number of pixels assigned to the second nozzle 72 serving as the alternative nozzle 34a is represented by N72, and the number of pixels assigned to the nozzles except for the second nozzle 72 in all alternative nozzles 34a by NLEFT1. The use rates R1 and R2 of the second nozzle 72 are represented by {N72/(N72+NLEFT1)}. In addition, among a plurality of pixels included in the scan line RA1 in the output image IM0, the number of pixels assigned to the third nozzle 73 serving as the alternative nozzle 34a is represented by N73, and the number of pixels assigned to the nozzles except for the third nozzle 73 in all alternative nozzles 34a by NLEFT2. The use rates R3 and R4 of the third nozzle 73 are represented by {N73/(N73+NLEFT2)}.

Further, for the scan line RA1, the first control section U1 controls the first use rate R1 of the Lk nozzle in the edge portion IMe to a rate lower than the third use rate R3 of the Y nozzle in the edge portion IMe. FIG. 4 illustrates an example in which, for the scan line RA1, no Lk dot is formed in the edge portion IMe whereas a Y dot is formed.

Figure 5A:
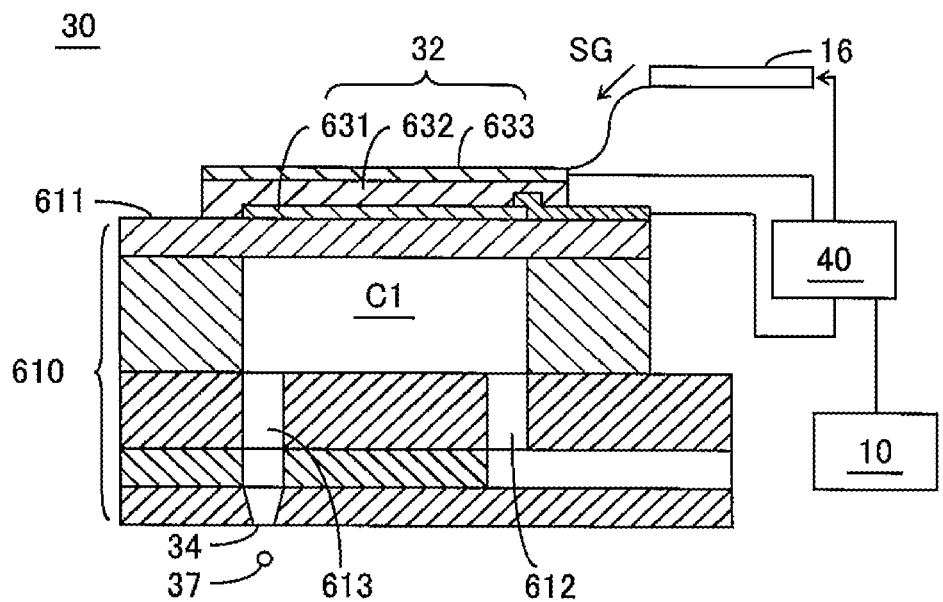
FIG. 5A is a drawing schematically illustrating an example of a main part of a recording head.
Figure 5B:
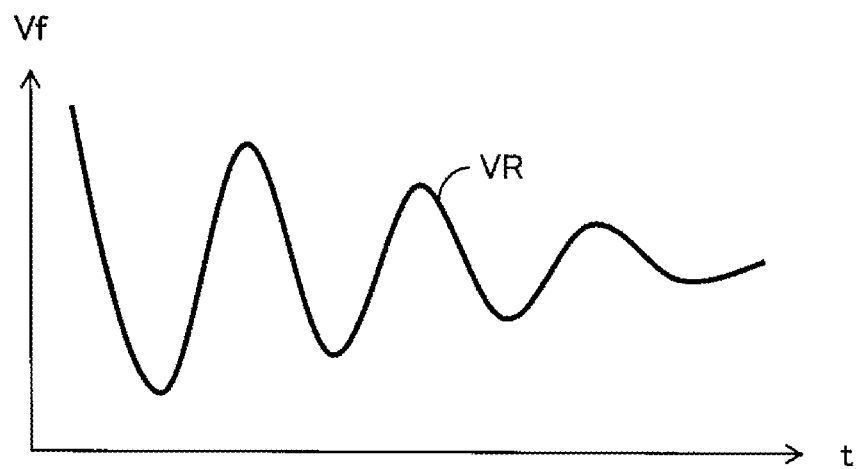
FIG. 5B is a drawing schematically illustrating an example of an electromotive force curve based on a residual vibration of a diaphragm.
Figure 6A:
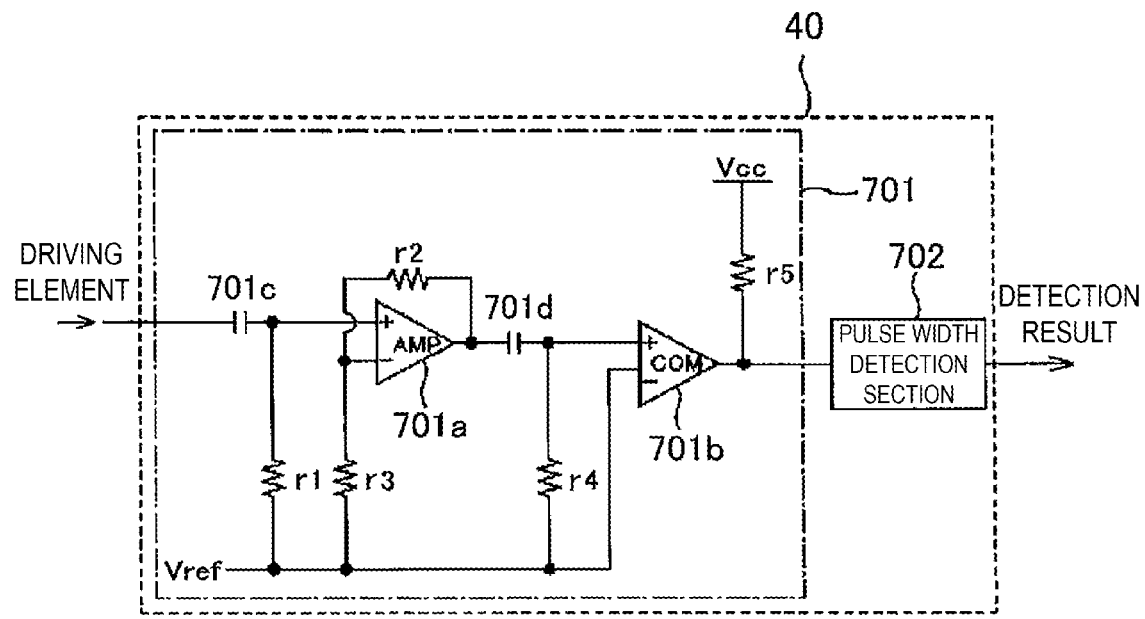
FIG. 6A is a drawing illustrating an example of an electric circuit of a defective nozzle detection section.
Figure 6B:
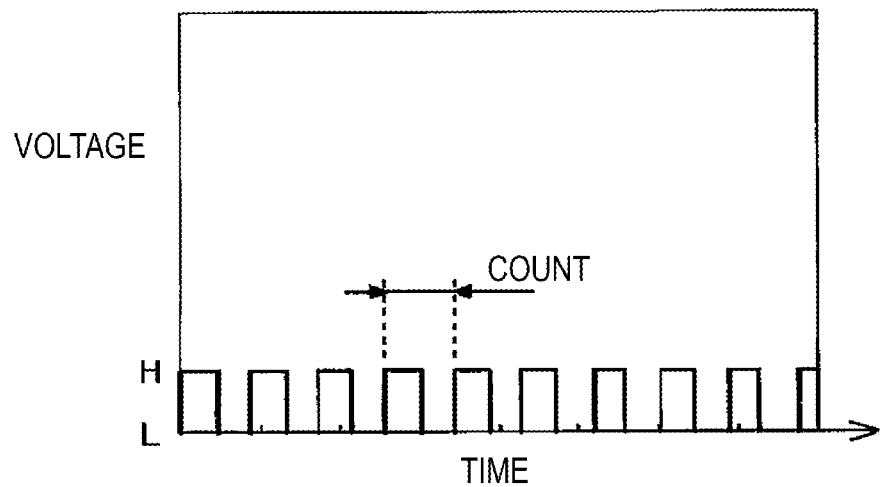
FIG. 6B is a drawing schematically illustrating an example of an output signal from an amplification section.

Next, with reference to FIGS. 5A, 5B, 6A and 6B, an example of a case where whether each nozzle 34 is a defective nozzle is detected is described. FIGS. 5A and 5B are drawings for describing a method of detecting the state of the nozzle 34. FIG. 5A is a drawing schematically illustrating an example of a main part of the recording head 30, and FIG. 5B schematically exemplifies an electromotive force curve VR based on a residual vibration of diaphragm 611. FIG. 6A illustrates an example of an electric circuit of the defective nozzle detection section 40, and FIG. 6B is a drawing schematically illustrating an example of an output signal from a comparator 701b. Naturally, the configuration of the defective nozzle detection section 40 is not limited to the example illustrated in FIGS. 5A, 5B, 6A and 6B, and various configurations may be adopted.

In a channel substrate 610 of the recording head 30 illustrated in FIG. 5A, a pressure chamber C1, an ink supply path 612 through which the ink 36 flows from the ink cartridge 35 to the pressure chamber C1, a nozzle communication path 613 through which the ink 36 flows from the pressure chamber C1 to the nozzle 34, and the like are formed. A silicon substrate and the like may be used as the channel substrate 610, for example. A diaphragm 611 that constitutes a part of the wall surface of the pressure chamber C1 is disposed at the surface of the channel substrate 610. The driving element 32 on the diaphragm 611 is a piezoelectric element including a first electrode 631 formed on the diaphragm 611, a piezoelectric body layer 632 substantially formed on the first electrode 631, and a second electrode 633 substantially formed on the piezoelectric body layer 632.

FIG. 5A illustrates a block diagram of a main part of the recording head 30 including the defective nozzle detection section 40 that detects an electromotive force state from the driving element 32 based on a residual vibration of the diaphragm 611. One end of the defective nozzle detection section 40 is electrically connected to the first electrode 631, and the other end of the defective nozzle detection section 40 is electrically connected to the second electrode 633.

FIG. 5B exemplifies the electromotive force curve VR of the driving element 32 based on a residual vibration of the diaphragm 611 that is generated after the driving signal SG for the discharged ink drop 37 from the nozzle 34 is supplied. Here, the abscissa indicates a time t, and the ordinate indicates an electromotive force Vf. The electromotive force curve VR indicates an example in which the ink drop 37 is discharged from a normal nozzle 34. When the ink drop 37 is not discharged from the nozzle 34 or the ink drop 37 is not discharged on a correct trajectory due to clogging or the like, it deviates from the electromotive force curve VR. Thus, whether the nozzle 34 is normal or defective can be detected using the detection circuit as illustrated in FIG. 6A.

The defective nozzle detection section 40 illustrated in FIG. 6A includes an amplification section 701 and a pulse width detection section 702. The amplification section 701 includes, for example, an operational amplifier 701a, the comparator 701b, capacitors 701c and 701d, and resistors r1 to r5. The resistor r5 is a pull-up resistor provided between a power-source line Vcc and an output part of the comparator 701b. When the driving signal SG output from the driving signal transmission section 16 is applied to the driving element 32, a residual vibration is generated, and an electromotive force based on the residual vibration is input to the amplification section 701. Low-frequency components included in this electromotive force are removed by a high pass filter composed of the capacitor 701c and the resistor r1, and the electromotive force after the low-frequency component is removed is amplified by a predetermined amplification factor by the operational amplifier 701a. The output of the operational amplifier 701a passes through a high pass filter composed of capacitor 701d and the resistor r4, and is compared with a reference voltage Vref by the comparator 701b and converted into a pulsed voltage of a high level H or a low level L depending on whether it is higher than the reference voltage Vref.

FIG. 6B illustrates an example of a pulsed voltage that is output from the comparator 701b and input to the pulse width detection section 702. The pulse width detection section 702 resets the count value at the rise of the input pulsed voltage, increments the count value for each predetermined period, and outputs the count value as a detection result to the controller 10 at the rise of the next pulsed voltage. The count value corresponds to the period of the electromotive force based on the residual vibration, and the sequentially output count values indicate the frequency characteristics of the electromotive force based on the residual vibration. The frequency characteristics, e.g., period, of the electromotive force of a case where the nozzle 34 is a defective nozzle are different from the frequency characteristics of the electromotive force of a case where the nozzle 34 is normal. In this manner, the controller 10 can determine that the nozzle 34 to be detected is normal when the sequentially input count value is within an acceptable range, and that the nozzle 34 to be detected is a defective nozzle when the sequentially input count value is not within the acceptable range.

By performing the above-described process on each nozzle 34, the controller 10 illustrated in FIGS. 2 and 5A can determine whether each nozzle 34 is a defective nozzle, and stores the determination result in the nonvolatile memory 20 as missing nozzle information.

3. SPECIFIC EXAMPLES OF RECORDING CONTROL PROCESS PERFORMED IN RECORDING CONTROL DEVICE

Next, with reference to FIG. 7 and the like, an example of a recording control process performed by the host device 100 as the recording control device 1 is described. In FIG. 7, step S112 corresponds to the edge extraction section U3 illustrated in FIG. 1, the edge extraction step ST3, and the edge extraction function 122 illustrated in FIG. 1. Step S114 corresponds to the replacement position specifying section U4 illustrated in FIG. 1, the replacement position identification step ST4, and the replacement position determination function 123 illustrated in FIG. 1. Step S120 corresponds to the first control section U1 illustrated in FIG. 1, the first control step ST1, a first control function, the second control section U2 illustrated in FIG. 1, the second control step ST2, and a second control function. In the following, the word "step" is omitted, and the reference numeral of the step is given in parentheses.

When the recording control process is started, the host device 100 performs a resolution conversion process of acquiring the input color gradation data DA1, e.g., RGB data, of a set resolution on the basis of the input image data DA0 (S110).

After the input color gradation data DA1 is acquired, the host device 100 performs an edge extraction process of extracting the edge portion IMe in the output image IM0 on the basis of the input color gradation data DA1 that is RGB data (S112). In the edge extraction process, the edge portion IMe and the non-edge portion IMn are extracted from the output image IM0.

Figure 8:
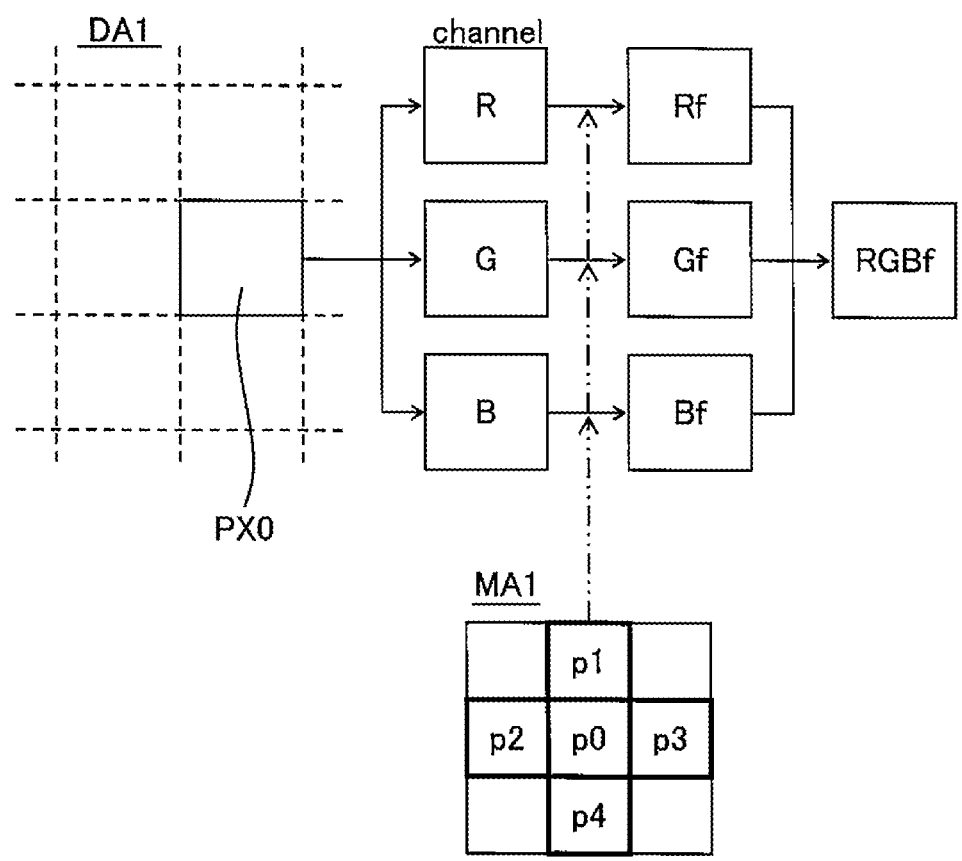
FIG. 8 is a drawing schematically illustrating an example in which an edge portion is extracted from input color gradation data.

FIG. 8 schematically exemplifies a state where an edge pixel RGBf as the edge portion IMe is extracted from each pixel PX0 of the input color gradation data DA1. The input color gradation data DA1 is an example of gradation data with a larger number of gradations than the halftone data DA3 representing a dot formation state. First, the edge extraction section U3 decomposes the input color gradation data DA1 that is RGB data into R, G and B channels and extracts edge pixels Rf, Gf and Bf for respective channels. The lower part in FIG. 8 illustrates a matrix MA1, which indicates the pixels to be calculated in the edge extraction process for each channel. The edge extraction section U3 performs the edge extraction process using a focus pixel p0 for determining whether it is an edge pixel, and surrounding pixels p1, p2, p3 and p4 located at four positions vertically or horizontally adjacent to the focus pixel p0. Whether the focus pixel p0 is edge pixels Rf, Gf and Bf can be determined based on the difference between the input value of the focus pixel p0 and the input values of the surrounding pixels p1 to p4. The input value of each of the pixels p0 to p4 can be calculated by the following formula.

$$\text{Input value} = \alpha 1 \times R + \alpha 2 \times G + \alpha 3 \times B$$

Here, coefficients $\alpha 1$, $\alpha 2$ and $\alpha 3$ are "1" for only the coefficient corresponding to a channel for performing the determination whether it is an edge pixel, and "0" for the rest. The R, G, and B in the equation are the gradation values of the R, G, and B components.

The edge extraction section U3 determines whether larger one of the absolute value of the difference between the input value of the focus pixel p0 and a maximum value Pmax of the input values of the surrounding pixels p1 to p4, and the absolute value of the difference between the input value of the focus pixel p0 and a minimum value Pmin of the input values of the surrounding pixels p1 to p4 is greater than a predetermined threshold value TH1. When the following inequality holds, it is determined that the focus pixel p0 is the edge pixels Rf, Gf and Bf.

$$\text{Max}(|P\text{max}|,|P\text{min}|) > TH1$$

Here, the function Max is a function for selecting a maximum value from among a plurality of components. When the above-mentioned inequality does not hold, it is determined that the focus pixel p0 is not the edge pixels Rf, Gf and Bf.

The edge extraction section U3 merges the edge pixels Rf, Gf and Bf of the channels, and extracts a result as the edge pixel RGBf. For example, the edge extraction section U3 extracts a pixel in which the edge pixels Rf, Gf and Bf are present in at least one channel, as the edge pixel RGBf. The edge portion IMe illustrated in FIGS. 3 and 4 is a collection of the edge pixels RGBf, and the non-edge portion IMn is the portion excluding the edge portion IMe in the output image IM0.

After the edge extraction process, the host device 100 performs a replacement position determination process of acquiring the replacement position for replacing the K ink to be discharged from the defective nozzle 71a in the output image IM0 with inks of C, M, Y, and Lk to be discharged from the plurality of alternative nozzles 34a (S114). The replacement position is, for example, a pixel where the dot is to be formed by the defective nozzle 71a detected by the defective nozzle detection section 40 in the plurality of pixels that constitute the output image IM0. To acquire the replacement position, the host device 100 may sort the input color gradation data DA1 in the order of the dot formation at the driving section 50, acquire the position of the pixel assigned to the defective nozzle 71a in a plurality of pixels that constitutes obtained data, and acquire, as the replacement position, the position of the pixel corresponding to the pixel of the above-described data in the original input color gradation data DA1. In addition, the host device 100 may perform a color conversion process referring to the base color conversion table LUTb, the halftone process, and the nozzle assignment process once, acquire the position of the pixel assigned to the defective nozzle 71a in a plurality of pixels that constitutes the obtained nozzle data, and acquire, as the replacement position, the position of the pixel corresponding to the pixel of the above-described nozzle data in the original input color gradation data DA1.

After replacement position determination process, the host device 100 performs a color conversion process of acquiring the output color gradation data DA2, e.g., CMYKLk data, on the basis of the input color gradation data DA1 (S120). The host device 100 selectively refers to the color conversion tables LUTb, LUTn and LUTe, and converts the input color gradation data DA1 into the output color gradation data DA2.

Figure 9:
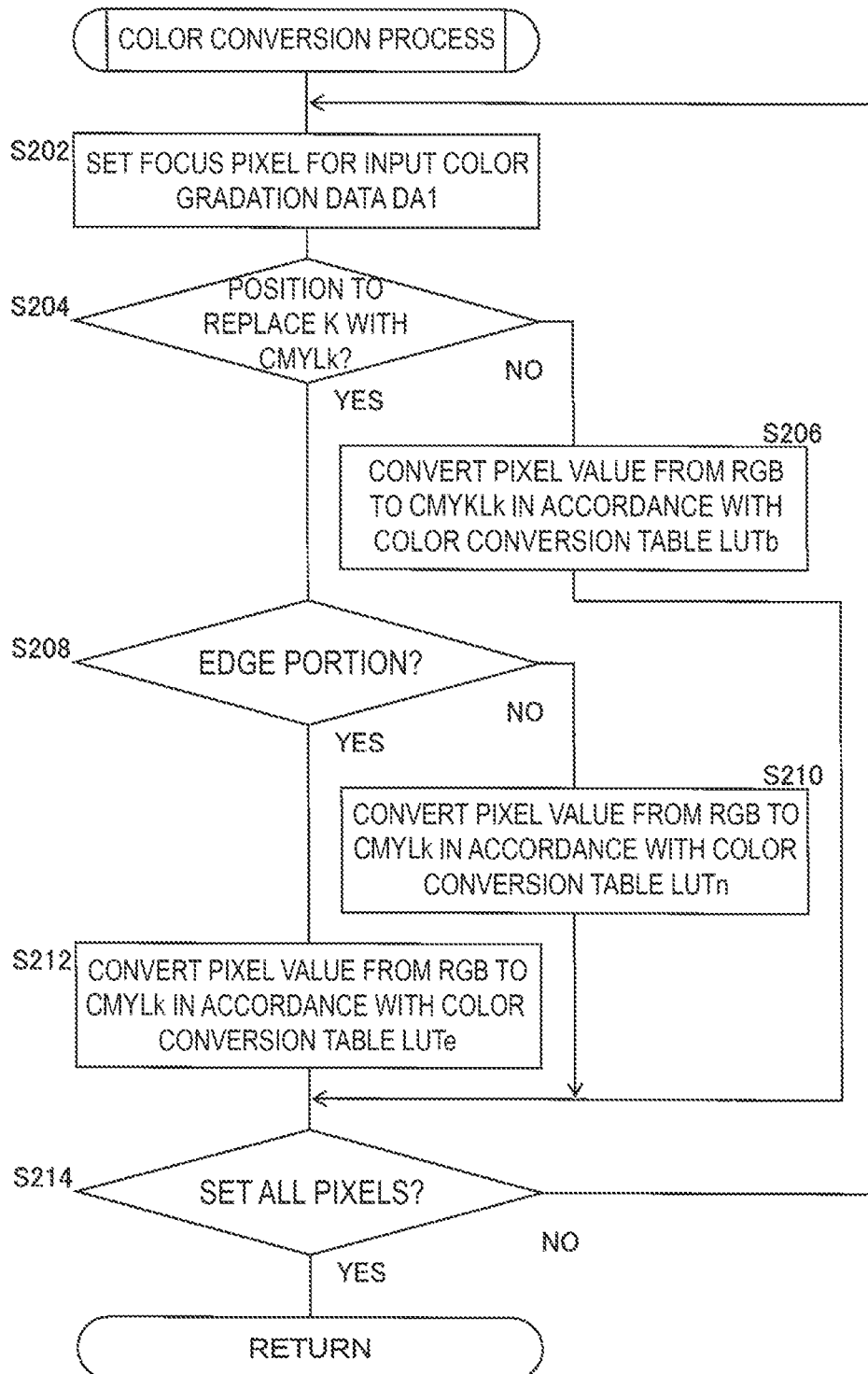
FIG. 9 is a flowchart of an example of a color conversion process.

FIG. 9 exemplifies a color conversion process performed by the host device 100.

When the color conversion process is started, the host device 100 sets a focus pixel in a plurality of pixels that constitutes the input color gradation data DA1 (S202). After setting the focus pixel, the host device 100 causes the process to branch in accordance with whether the focus pixel is the replacement position for replacing the K ink with inks of C, M, Y and Lk (S204). When the focus pixel is not the replacement position, the host device 100 proceeds the process to S206, converts the pixel value of the focus pixel from R, G, B into C, M, Y, K and Lk in accordance with the base color conversion table LUTb, and then proceeds the process to S214. The pixel value after the conversion is the pixel value of the focus pixel of the output color gradation data DA2 that is CMYKLk data.

When it is determined that the focus pixel is the replacement position in the determination process of S204, the host device 100 proceeds the process to S208, and causes the process to branch in accordance with whether the focus pixel is the edge portion IMe. When the focus pixel is not the edge portion IMe, the host device 100 proceeds the process to S210, converts the pixel value of the focus pixel from R, G and B into C, M, Y and Lk in accordance with the non-edge portion color conversion table LUTn, and then proceeds the process to S214. In this manner, the K ink to be discharged from the defective nozzle 71a is replaced by the inks of C, M, Y and Lk to be discharged from the plurality of alternative nozzles 34a. On the other hand, when the focus pixel is the edge portion IMe, the host device 100 proceeds the process to S212, converts the pixel value of the focus pixel from R, G and B into C, M, Y and Lk in accordance with the edge portion color conversion table LUTe, and then proceeds the process to S214. In this manner, the K ink to be discharged from the defective nozzle 71a is replaced by the inks of C, M, Y and Lk to be discharged from the plurality of alternative nozzles 34a.

At S214, the host device 100 causes the process to branch in accordance with whether all pixels of the input color gradation data DA1 have been set as the focus pixel. When there is a pixel that has yet not been set as the focus pixel in the plurality of pixels that constitutes the input color gradation data DA1, the host device 100 returns the process to S202. When all pixels of the input color gradation data DA1 have been set as the focus pixel, the host device 100 terminates the color conversion process.

FIG. 10 schematically exemplifies structures of the color conversion tables LUTb, LUTn and LUTe stored in the storage device 114. The color conversion tables LUTb, LUTn and LUTe are data tables that represent the correspondence between coordinate values in a virtual space of input colors and coordinate values in a virtual space of output colors. Here, (R, G and B) represent the coordinate values in the virtual space of input colors R, G and B, (K, C, M, Y and Lk) represent the coordinate values in the virtual space of output colors K, C, M, Y and Lk, and i represents a variable for identifying grid points set in the virtual space of the input colors. In the base color conversion table LUTb, the coordinate values on the input side (Ri, Gi and Bi) are associated with the coordinate values on the output side (Ki, Ci, Mi, Yi and Lki). In the case where the pixel values of the input color gradation data DA1 are (Ri, Gi and Bi), the pixel values of the output color gradation data DA2 are (Ki, Ci, Mi, Yi and Lki) with reference to the base color conversion table LUTb. In the case where the pixel values of the input color gradation data DA1 do not match the coordinate value of the input side of the base color conversion table LUTb, the host device 100 may perform an operation of interpolating the pixel values of the output color gradation data DA2 from the coordinate values on the output side at a plurality of grid points that exists in the vicinity of the pixel values. In the illustration in FIG. 10, assuming 256-level coordinate values, the coordinate values on the input side (0, 0, 0) are associated with the coordinate values on the output side (255, 0, 0, 0, 0). In this case, in the case where the pixel values of the input color gradation data DA1 are (0, 0, 0), only the K ink is used, and the inks of C, M, Y and Lk are not used.

In the non-edge portion color conversion table LUTn, the coordinate values on the input side (Ri, Gi and Bi) are associated with the coordinate values on the output side (0, CNi, MNi, YNi and LkNi). Since the K value on the output side is 0, the K nozzle is not used and the K ink is not used unlike the case of the base color conversion table LUTb. Here, a coordinate value LkNi corresponds to the second use rate R2 of the Lk nozzle in the non-edge portion IMn, and coordinate value YNi corresponds to the fourth use rate R4 of the Y nozzle in the non-edge portion IMn. In the illustration of FIG. 10, the coordinate values on the input side (0, 0, 0) are associated with the coordinate values on the output side (0, 64, 64, 64, 63). In this case, in the case where the pixel values of the input color gradation data DA1 are (0, 0, 0), the K ink is not used, and the inks of C, M, Y and Lk are used in place of the K ink. That is, in place of the K nozzle, the C nozzle, M nozzle, Y nozzle, and Lk nozzle are used.

In the edge portion color conversion table LUTe, the coordinate values on the input side (Ri, Gi and Bi) are associated with the coordinate values on the output side (0, CEi, MEi, YEi and LkEi). Since the K value on the output side is 0, the K nozzle is not used and the K ink is not used as in the case of the non-edge portion color conversion table LUTn. Here, the coordinate value LkEi corresponds to the first use rate R1 of the Lk nozzle in the edge portion IMe, and the coordinate value YEi corresponds to the third use rate R3 of the Y nozzle in the edge portion IMe. In the illustration of FIG. 10, the coordinate values on the input side (0, 0, 0) are associated with the coordinate values on the output side (0, 112, 112, 31, 0). In this case, in the case where the pixel values of the input color gradation data DA1 is (0, 0, 0), the inks of K and Lk are not used, and the inks of C, M and Y are used in place of the K ink. That is, the C nozzle, M nozzle and Y nozzle are used in place of the K nozzle, and the Lk nozzle is not used.

The coordinate value LkEi on the output side of the edge portion color conversion table LUTe is smaller than the coordinate value LkNi on the output side of the non-edge portion color conversion table LUTn. Thus, the first use rate R1 of the Lk nozzle in the edge portion IMe is lower than the second use rate R2 of the Lk nozzle in the non-edge portion IMn. As a result, the conspicuity of widening of the edge portion IMe due to the recording head 30 with an inclination error is suppressed. The coordinate value LkNi is preferably 0. In this manner, the Lk ink is not used for the edge portion IMe at the replacement position of K, and the conspicuity of widening of the edge portion IMe due to the recording head 30 with an inclination error is further suppressed.

The coordinate value YEi on the output side of the edge portion color conversion table LUTe is smaller than the coordinate value YNi on the output side of the non-edge portion color conversion table LUTn. Thus, the third use rate R3 of the Y nozzle in the edge portion IMe is lower than the fourth use rate R4 of the Y nozzle in the non-edge portion IMn. Thus, the third use rate R3 of the Y nozzle in the edge portion IMe is lower than the fourth use rate R4 of the Y nozzle in the non-edge portion IMn.

The coordinate value LkEi on the output side of the edge portion color conversion table LUTe is smaller than the coordinate value YEi on the output side of the edge portion color conversion table LUTe. Thus, the first use rate R1 of the Lk nozzle in the edge portion IMe is lower than the third use rate R3 of the Y nozzle in the edge portion IMe. Thus, the third use rate R3 of the Y nozzle in the edge portion IMe is lower than the fourth use rate R4 of the Y nozzle in the non-edge portion IMn.

After the color conversion process, the host device 100 performs a halftone process of acquiring the halftone data DA3 for each color on the basis of the output color gradation data DA2 (S130 in FIG. 7). The host device 100 generates two- or four-valued halftone data DA3 through a halftone process such as a dither method with the multi-gradation output color gradation data DA2 for each color of CMYKLk, for example.

After the halftone data DA3 is acquired, the host device 100 performs the nozzle assignment process of generating the nozzle data DA4 on the basis of the halftone data DA3 for each color (S140). The host device 100 generates the nozzle data DA4 by sorting the halftone data DA3 in the order of the dot formation at the driving section 50.

After the generation of the nozzle data DA4, the host device 100 transmits the nozzle data DA4 to the recording device 2 illustrated in FIG. 2 (S150), and terminates the recording control process. Upon reception of the nozzle data DA4, the recording device 2 transmits, at the driving signal transmission section 16, a control signal to the recording head 30 and the driving section 50 on the basis of the nozzle data DA4. From the nozzle data DA4, the driving signal transmission section 16 generates the driving signal SG corresponding to the voltage signal to be applied to the driving element 32, and outputs it to the driving circuit 31. The recording device 2 causes the driving section 50 to relatively move the recording head 30 and the medium ME1 in the relative movement direction D4, and causes recording head 30 to discharge the ink drop 37 to the medium ME1 in accordance with the driving signal SG. Thus, the output image IM0 including the dots DT0 of a plurality of output colors is formed on the medium ME1.

In the above-described process, the color conversion process referring to the non-edge portion color conversion table LUTn, the halftone process, and the nozzle assignment process correspond to the second control section U2 that forms the non-edge portion IMn in the output image IM0. In addition, the color conversion process referring to the edge portion color conversion table LUTe, the halftone process, and the nozzle assignment process correspond to the first control section U1 that forms the edge portion IMe in the output image IM0.

As illustrated in FIG. 4, the recording head 30 attached to the recording device 2 may have an inclination in a direction of rotation along the nozzle surface 38. In the case where the edge portion IMe of the code image CD is present along the scan line RA1 passing through the defective nozzle 71a of K, the dots of C, M, Y and Lk are formed in a spread manner in the nozzle alignment direction D3. The misalignment of the dot DT0 in the nozzle alignment direction D3 increases with the increasing distance of the alternative nozzle 34a from the K nozzle row 33K, and increases in the order of the C dot, M dot, Y dot, and Lk dot. In the present specific example, in the case where the K ink to be discharged from the K nozzle is replaced by the ink to be discharged from the nozzle of C, M, Y and Lk, the first use rate R1 of the Lk nozzle in the edge portion IMe is set to a rate lower than the second use rate R2 of the Lk nozzle in the non-edge portion IMn. In this manner, the conspicuity of widening of the edge portion IMe due to the recording head 30 with an inclination error is suppressed, and the reduction in the image quality of the edge portion IMe is suppressed. As a result, the accuracy of reading of the code image CD such as a bar code by a reading device is improved. In addition, in the case where the Lk nozzle is not used for forming the edge portion IMe at the replacement position of K, the conspicuity of widening of the edge portion IMe due to the recording head 30 with an inclination error is further suppressed.

In addition, in the case where the K ink to be discharged from the K nozzle is replaced by the ink to be discharged from the nozzle of C, M, Y and Lk, the third use rate R3 of the Y nozzle in the edge portion IMe is set to a rate lower than the fourth use rate R4 of the Y nozzle in the non-edge portion IMn. Further, in the case where the K ink to be discharged from the K nozzle is replaced by the ink to be discharged from the nozzle of C, M, Y and Lk, the first use rate R1 of the Lk nozzle in the edge portion IMe is set to a rate lower than the third use rate R3 of the Y nozzle in the edge portion IMe.

Thus, the present specific example can suppress the conspicuity of widening of the edge portion IMe due to the recording head 30 with an inclination error.

4. MODIFICATIONS

Various modifications may be made in the present disclosure.

For example, at least a part of the above-described process may be performed by the recording device 2. In the case where the host device 100 can transmit the input image data DA0 illustrated in FIG. 1 to the recording device 2, the recording device 2 illustrated in FIG. 2 may receive the input image data DA0 from the host device 100, convert the input image data DA0 into the input color gradation data DA1 at the resolution conversion section 12, convert the input color gradation data DA1 into the output color gradation data DA2 at the color conversion section 13, convert the output color gradation data DA2 into the halftone data DA3 at the halftone processing section 14, and convert the halftone data DA3 into the nozzle data DA4 at the nozzle assignment section 15. Thereafter, as described above, the controller 10 can control the recording on the medium ME1 by the recording head 30 and the relative movement of the recording head 30 and the medium ME1 by the driving section 50 in accordance with the nozzle data DA4. In this case, the recording control device 1 is included in the recording device 2.

In addition, the output image IM0 may be formed in such a manner that the input color gradation data DA1 transmitted by the host device 100 is received by the recording device 2. The output image IM0 may be formed in such a manner that the output color gradation data DA2 transmitted by the host device 100 is received by the recording device 2. The output image IM0 may be formed in such a manner that the halftone data DA3 transmitted by the host device 100 is received by the recording device 2. In each case, the recording control device 1 is included in the host device 100 and the recording device 2.

The type of the ink used in the recording device is not limited to C, M, Y, K and Lk, and may include, in addition to C, M, Y, K and Lk, light cyan less dense than C, light magenta less dense than M, dark yellow more dense than Y, orange, green, clear for improving the image quality, and the like. In addition, the present technology is also applicable to recording devices that do not use some of liquids of C, M, Y, K and Lk.

The case where the first ink to be discharged from the first nozzle 71 is replaced by the ink to be discharged from the plurality of alternative nozzles 34a is not limited to the case where the first nozzle 71 is a defective nozzle, and may be a case where the first ink is replaced by other types of ink through resolution conversion. For example, in the replacement position determination process at S114 illustrated in FIG. 7, the host device 100 may determine, as the replacement position, the pixel where (R, G, B)=(0, 0, 0) is no longer (R, G, B)=(0, 0, 0) as a result of the resolution conversion process at S110.

The above-described process may be appropriately changed by changing the order and the like. For example, as illustrated in FIGS. 11 and 12, the use rates R1 and R3 may be changed in accordance with the inclination θ of the recording head 30.

Figure 11:
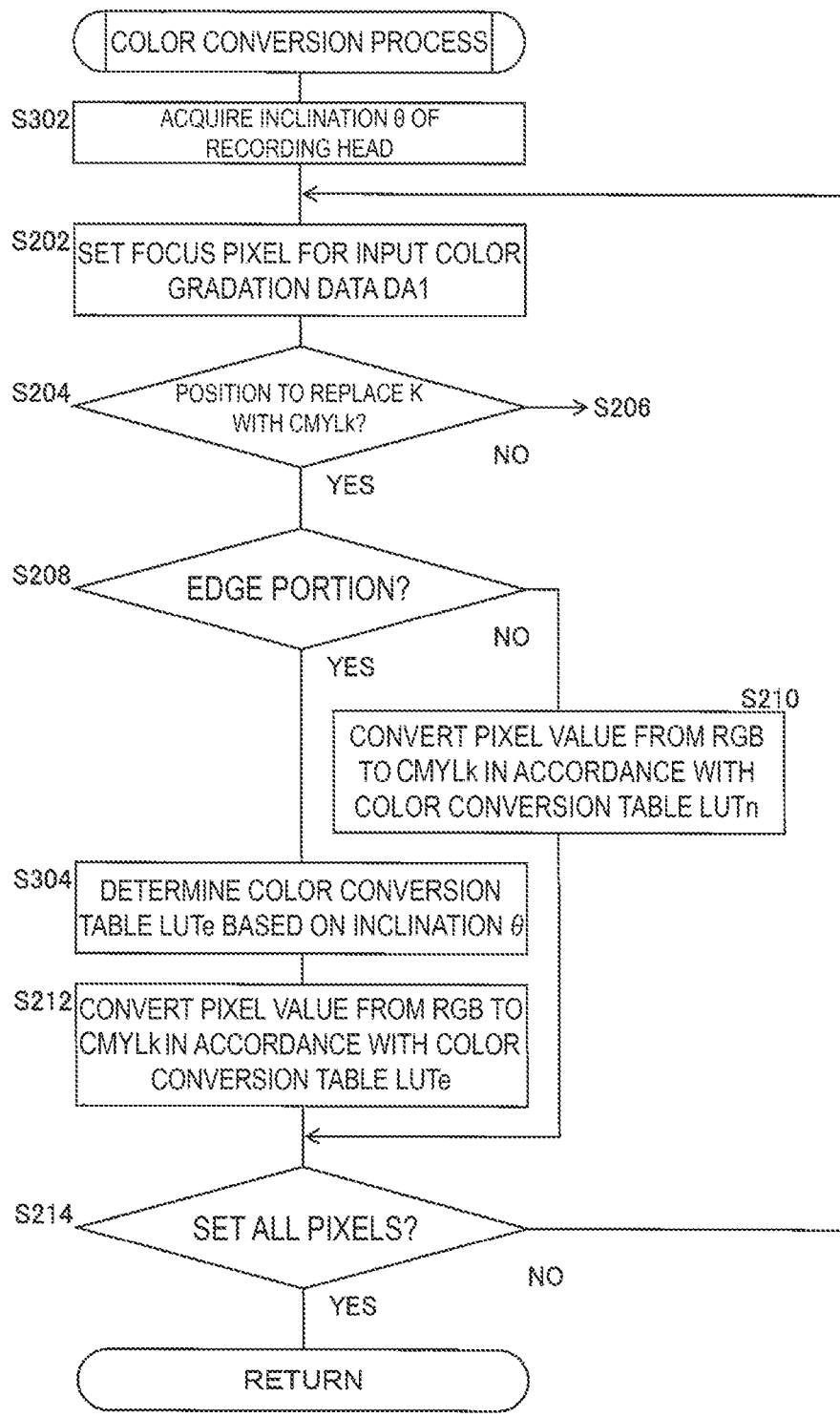
FIG. 11 is a flowchart of another example of the color conversion process.
Figure 12:
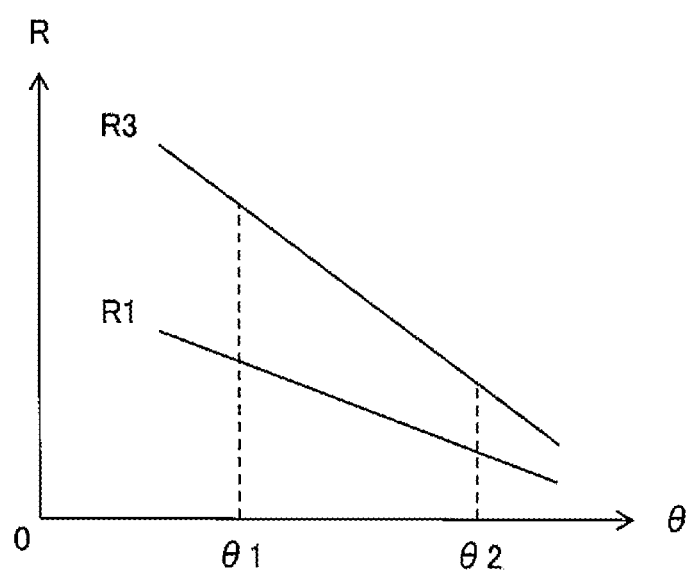
FIG. 12 is a drawing schematically illustrating an example of a first use rate R1 and a third use rate R3 in accordance with an inclination.

FIG. 11 exemplifies a color conversion process performed in the host device 100 illustrated in FIGS. 1 and 2. In comparison with the color conversion process illustrated in FIG. 9, the color conversion process illustrated in FIG. 11 additionally includes S302 before S202, and S304 between S208 and S212. For the ease of illustration, the illustration of S206 is omitted. For the ease of illustration, the illustration of S206 is omitted. The edge portion color conversion table LUTe illustrated in FIG. 10 includes a plurality of color conversion tables for the use rates R1 and R3 in accordance with the inclination 9 illustrated in FIG. 12.

When the color conversion process illustrated in FIG. 11 is started, the host device 100 acquires the inclination θ of the recording head 30 from the recording device 2 (S302). For example, the host device 100 transmits a request of the inclination θ to the recording device 2. Upon reception of the request, the recording device 2 reads the inclination θ from the nonvolatile memory 20, and transmits it to the host device 100. The host device 100 receives the inclination θ from the recording device 2, and stores it in the storage device 114.

After the inclination 9 is acquired, the host device 100 sets a focus pixel for the input color gradation data DA1 (S202), and causes the process to branch in accordance with whether the focus pixel is the replacement position (S204). When the focus pixel is the replacement position, the host device 100 causes the process to branch in accordance with whether the focus pixel is the edge portion IMe (S208). When the focus pixel is not the edge portion IMe, the host device 100 proceeds the process to S210, and converts the pixel value of the focus pixel from R, G and B into C, M, Y and Lk in accordance with the non-edge portion color conversion table LUTn illustrated in FIG. 10, and proceeds the process to S214. On the other hand, when the focus pixel is the edge portion IMe, the host device 100 proceeds the process to S304, and determines the edge portion color conversion table LUTe on the basis of the inclination θ.

As illustrated in FIG. 12, the first use rate R1 of the Lk nozzle in the edge portion IMe is set to decrease as the inclination θ increases. Accordingly, the first use rate R1 of the case where the inclination θ is the second inclination θ2 is lower than the first use rate R1 of the case where the inclination θ is the first inclination θ1. The first use rate R1 corresponds to the coordinate value LkEi of the edge portion color conversion table LUTe illustrated in FIG. 10. In addition, the third use rate R3 of the Y nozzle in the edge portion IMe is set to decrease as the inclination θ increases. Accordingly, the third use rate R3 of the case where the inclination θ is the second inclination e2 is lower than the third use rate R3 of the case where the inclination θ is the first inclination θ1. The third use rate R3 corresponds to the coordinate value YEi of the edge portion color conversion table LUTe illustrated in FIG. 10. The edge portion color conversion table LUTe includes a plurality of color conversion tables such that the coordinate value LkEi decreases and the coordinate value YEi decreases as the inclination θ increases.

After the edge portion color conversion table LUTe is determined, the host device 100 converts the pixel value of the focus pixel from R, G and B into C, M, Y and Lk in accordance with the determined edge portion color conversion table LUTe, and proceeds the process to S214. In this manner, the K ink to be discharged from the defective nozzle 71a is replaced by the inks of C, M, Y and Lk to be discharged from the plurality of alternative nozzles 34a. In addition, with the use of the edge portion color conversion table LUTe in accordance with the inclination θ in the color conversion process, when the inclination θ is the first inclination θ1*greater* than the second inclination θ2, the first use rate R1 and the third use rate R3 are lower than the case where the inclination θ is the first inclination θ1.

Thus, the conspicuity of widening of the edge portion IMe is suppressed in the case where the inclination e of the recording head 30 is the second inclination e2*greater* than the first inclination θ1. That is, FIGS. 11 and 12 illustrate a favorable case where the reduction in the image quality of the edge portion IMe is suppressed.

Figure 13:
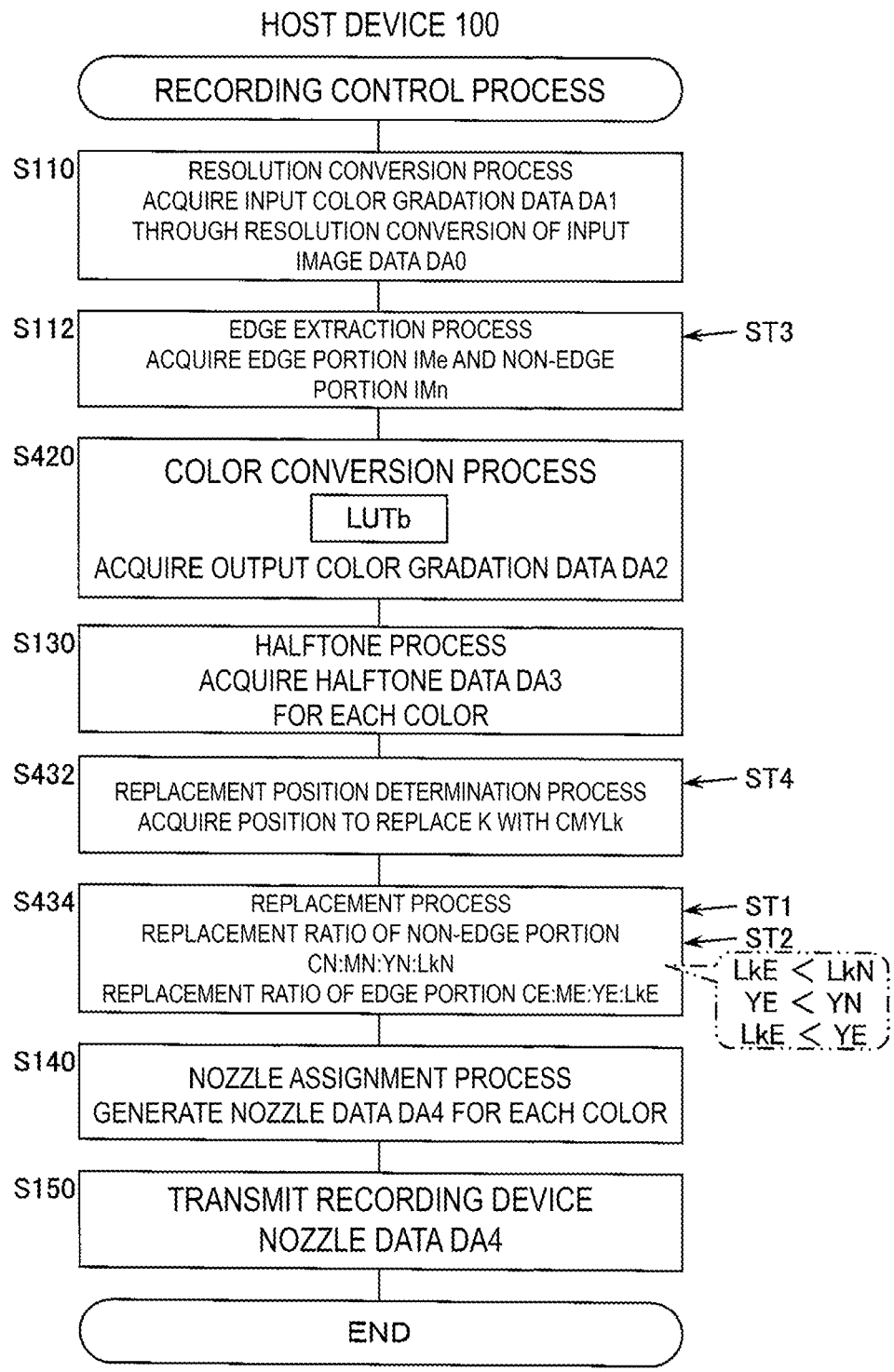
FIG. 13 is a flowchart of another example of the recording control process.

In addition, as exemplified in FIG. 13, a replacement process may be performed on the halftone data DA3 without using the edge portion color conversion table LUTe and the non-edge portion color conversion table LUTn. FIG. 13 illustrates another example of the recording control process. In the recording control process illustrated in FIG. 13 in comparison with the recording control process illustrated in FIG. 7, S114 is replaced by S432 at immediately after S130, S120 is replaced by S420, and S434 is added between S432 and S140.

When the recording control process is started, the host device 100 performs the resolution conversion process (S110) and the edge extraction process (S112). After the edge extraction process, the host device 100 performs a color conversion process that refers to the base color conversion table LUTb (S420). In this color conversion process, the non-edge portion color conversion table LUTn and the edge portion color conversion table LUTe are not used. Accordingly, the pixel value of each pixel of the input color gradation data DA1 is converted in accordance with the base color conversion table LUTb regardless of whether it is the non-edge portion IMn or the edge portion IMe and regardless of whether the K ink is a pixel that is replaced by the ink of C, M, Y and Lk.

After the color conversion process, the host device 100 performs the halftone process (S130). After the halftone data DA3 is acquired, the host device 100 performs a replacement position determination process of acquiring the replacement position for replacing the K ink to be discharged from the defective nozzle 71a in the output image IM0 with the ink of C, M, Y and Lk to be discharged from the plurality of alternative nozzles 34a (S432). After the halftone data DA3 is acquired, the host device 100 performs a replacement position determination process of acquiring the replacement position for replacing the K ink to be discharged from the defective nozzle 71a in the output image IM0 with the ink of C, M, Y and Lk to be discharged from the plurality of alternative nozzles 34a (S432). In addition, the host device 100 may perform the nozzle assignment process once, acquire the position of the pixel assigned to the defective nozzle 71a in a plurality of pixels that constitutes the obtained nozzle data, and acquire, as the replacement position, the position of the pixel corresponding to the pixel of the above-described nozzle data in the original halftone data DA3.

After the replacement position determination process, the host device 100 performs a replacement process of replacing the K dot of the replacement position of the halftone data DA3 with the dot of of C, M, Y and Lk (S434). The host device 100 converts the pixel value of the replacement position of the halftone data DA3 such that the replacement ratio of C, M, Y and Lk of the non-edge portion IMn is CN:MN:YN:LkN, and that the replacement ratio of C, M, Y and Lk of the edge portion IMe is CE:ME:YE:LkE. The replacement ratio CN:MN:YN:LkN of the non-edge portion IMn may be set as, for example, the ratio CNi:MNi:YNi:LkNi of the coordinate value of the non-edge portion color conversion table LUTn illustrated in FIG. 10. The replacement ratio CE:ME:YE:LkE of the edge portion Ime may be set as, for example, the ratio CEi:MEi:YEi:LkEi of the coordinate value of the edge portion color conversion table LUTe illustrated in FIG. 10. The replacement ratio LkN of Lk of the non-edge portion IMn corresponds to the second use rate R2 of the Lk nozzle, and the replacement ratio YN of Y of the non-edge portion IMn corresponds to the fourth use rate R4 of the Y nozzle.

The replacement ratio LkE of Lk of the edge portion IMe corresponds to the first use rate R1 of the Lk nozzle, and the replacement ratio YE of Y of the edge portion IMe corresponds to the third use rate R3 of the Y nozzle.

The replacement ratio LkE of Lk of the edge portion IMe is smaller than the replacement ratio LkN of Lk of the non-edge portion IMn. Thus, the first use rate R1 of the Lk nozzle in the edge portion IMe is lower than the second use rate R2 of the Lk nozzle in the non-edge portion IMn. As a result, the conspicuity of widening of the edge portion IMe due to the recording head 30 with an inclination error is suppressed. The replacement ratio LkE of Lk of the edge portion IMe is preferably 0. In this manner, the Lk ink is not used for the edge portion IMe at the replacement position of K, and the conspicuity of widening of the edge portion IMe due to the recording head 30 with an inclination error is further suppressed.

The replacement ratio YE of Y of the edge portion IMe is smaller than the replacement ratio YN of Y of the non-edge portion IMn. Thus, the third use rate R3 of the Y nozzle in the edge portion IMe is lower than the fourth use rate R4 of the Y nozzle in the non-edge portion IMn. Thus, the third use rate R3 of the Y nozzle in the edge portion IMe is lower than the fourth use rate R4 of the Y nozzle in the non-edge portion IMn.

The replacement ratio LkE of Lk of the edge portion IMe is smaller than the replacement ratio YE of Y of the edge portion IMe. Thus, the first use rate R1 of the Lk nozzle in the edge portion IMe is lower than the third use rate R3 of the Y nozzle in the edge portion IMe. Thus, the third use rate R3 of the Y nozzle in the edge portion IMe is lower than the fourth use rate R4 of the Y nozzle in the non-edge portion IMn.

After the replacement process, the host device 100 performs the nozzle assignment process (S140), transmits the nozzle data DA4 to the recording device 2 illustrated in FIG. 2 (S150), and terminates the recording control process.

In the above-described process, the replacement process for achieving the replacement ratio CN:MN:YN:LkN of the non-edge portion IMn and the nozzle assignment process correspond to the second control section U2 that forms the non-edge portion IMn of the output image IM0. In addition, the replacement process for achieving the replacement ratio CE:ME:YE:LkE of the edge portion IMe and the nozzle assignment process correspond to the first control section U1 that forms the edge portion IMe in the output image IM0.

Even when the recording control process illustrated in FIG. 13 is performed, the conspicuity of widening of the edge portion IMe due to the recording head 30 with an inclination error is suppressed, and the reduction in the image quality of the edge portion IMe is suppressed. As a result, the accuracy of reading of the code image CD such as a bar code by a reading device is improved.

The first ink to be replaced by a plurality of types of ink is not limited to the K ink. For example, in the case where a defective nozzle is present in the C nozzle row as in the recording head 30 exemplified FIG. 14A, the C ink may correspond to the first ink, the C nozzle to the first nozzle 71, and the C nozzle row to the first nozzle row 61. In this case, the nozzle row farthest from the C nozzle row in the relative movement direction D4 is the Lk nozzle row, and the second farthest nozzle row is the Y nozzle row. Accordingly, the Lk ink corresponds to the second ink, the Lk nozzle to the second nozzle 72, the Lk nozzle row to the second nozzle row 62, the Y ink to the third ink, the Y nozzle to the third nozzle 73, the Y nozzle row to the third nozzle row 63, the M ink to the fourth ink, the M nozzle to the fourth nozzle 74, and the M nozzle row to the fourth nozzle row 64.

Figure 14A:
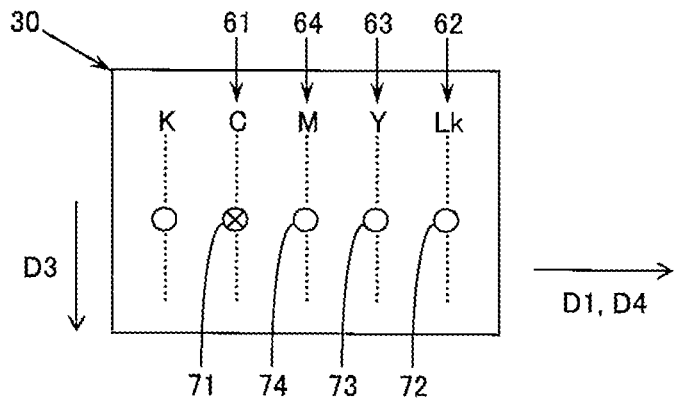
FIGS. 14A to 14C are drawings schematically illustrating another example of the recording head.
Figure 14B:
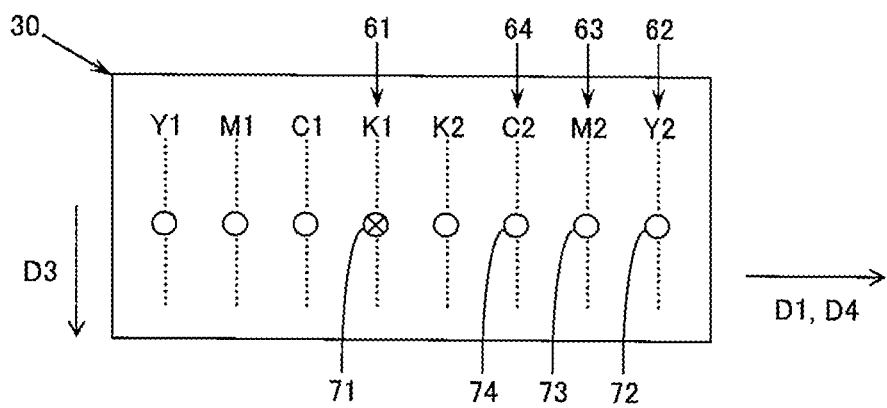

The present technology is applicable also to the recording head 30 including a Y1 nozzle row, a M1 nozzle row, a C1 nozzle row, a K1 nozzle row, a K2 nozzle row, a C2 nozzle row, an M2 nozzle row, and a Y2 nozzle row in the order of the relative movement direction D4 as exemplified in FIG. 14B. Here, the K1 nozzle row and the K2 nozzle row are nozzle rows for discharging the K ink, the C1 nozzle row and the C2 nozzle row are nozzle rows for discharging the C ink, the M1 nozzle row and the M2 nozzle row are nozzle rows for discharging the M ink, and the Y1 nozzle row and the Y2 nozzle row are nozzle rows for discharging the Y ink. For example, in the case where a defective nozzle is present in the K1 nozzle row, the defective nozzle corresponds to the first nozzle 71, and the K1 nozzle row to the first nozzle row 61. In this case, the nozzle row farthest from the K1 nozzle row in the relative movement direction D4 is the Y2 nozzle row, and the second farthest nozzle row is the M2 nozzle row. Accordingly, the Y2 nozzle row corresponds to the second nozzle row 62 including the second nozzle 72, the M2 nozzle row to the third nozzle row 63 including the third nozzle 73, and the C2 nozzle row to the fourth nozzle row 64 including the fourth nozzle 74. Although not illustrated in the drawing, in the case where a defective nozzle is present in the K2 nozzle row, the defective nozzle corresponds to the first nozzle 71, and the K2 nozzle row to the first nozzle row 61. In this case, the nozzle row farthest from the K2 nozzle row in the relative movement direction D4 is the Y1 nozzle row, and the second farthest nozzle row is the M1 nozzle row. Accordingly, the Y1 nozzle row corresponds to the second nozzle row 62 including the second nozzle 72, the M1 nozzle row to the third nozzle row 63 including the third nozzle 73, and the C1 nozzle row to the fourth nozzle row 64 including the fourth nozzle 74.

Figure 14C:
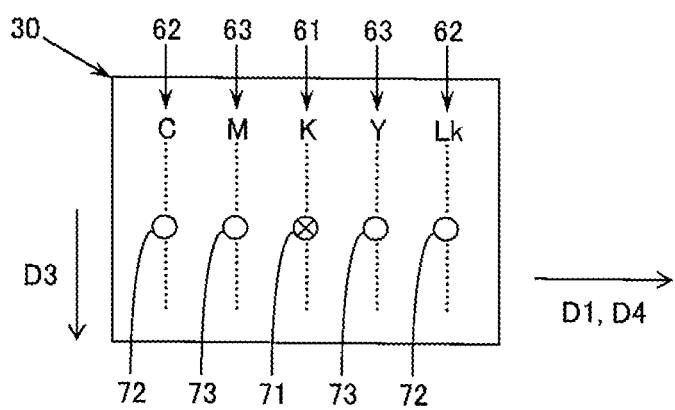

The present technology is also applicable to the recording head 30 including the C nozzle row, the M nozzle row, the K nozzle row, the Y nozzle row and the Lk nozzle row in the order of the relative movement direction D4 as exemplified in FIG. 14C. In the case where a defective nozzle is present in the K nozzle row, the defective nozzle corresponds to the first nozzle 71, and the K nozzle row corresponds to the first nozzle row 61. Here, the nozzle row farthest from the K nozzle row in the relative movement direction D4 is two nozzle rows, the C nozzle row and the Lk nozzle row. In this case, both the C nozzle row and the Lk nozzle row may correspond to the second nozzle row 62, the C nozzle row may correspond to the second nozzle row 62 with the Lk nozzle row not corresponding to the second nozzle row 62, or the Lk nozzle row may correspond to the second nozzle row 62 with the C nozzle row not corresponding to the second nozzle row 62. In the case where the C nozzle row corresponds to the second nozzle row 62, the M nozzle row corresponds to the third nozzle row 63, whereas in the case where the Lk nozzle row corresponds to the second nozzle row 62, the Y nozzle row corresponds to the third nozzle row 63. Naturally, the second nozzle row 62 includes the second nozzle 72, and the third nozzle row 63 includes the third nozzle 73.

In each case, the edge portion IMe is formed such that the first use rate R1 of the second nozzle 72 in the edge portion IMe is lower than the second use rate R2 of the second nozzle 72 in the non-edge portion IMn when the K ink to be discharged from the first nozzle 71 is replaced by the ink to be discharged from a plurality of alternative nozzles. Thus, the conspicuity of widening of the edge portion IMe due to the recording head 30 with an inclination error is suppressed.

Note that even in the case where the recording control device 1 does not include the edge extraction section U3, the edge portion IMe may be formed such that the first use rate R1 is lower than the second use rate R2 when the first ink to be discharged from the first nozzle 71 is replaced by the ink to be discharged from the plurality of alternative nozzles 34a as long as there is information about the edge portion IMe included in the output image IM0.

5. CONCLUSION

As described above, the present disclosure can provide a technique for suppressing reduction in the image quality in an edge portion and the like in various aspects. Naturally, the above-described basic actions and effects can be obtained even with technology composed only of the elements of the independent claims.

It is also possible to implement a configuration in which each configuration disclosed in the examples above is mutually substituted or combined with each other, or a configuration in which each configuration disclosed in the known technology and the examples above is mutually substituted or combined with each other, and the like. The present disclosure includes these configurations and the like.

What is claimed is:

1. A recording control device configured to control recording on a medium by a recording head including a plurality of nozzle rows, and a relative movement of the recording head and the medium in a relative movement direction that intersects a nozzle alignment direction of the nozzle row, wherein the plurality of nozzle rows include a first nozzle row including a plurality of first nozzles configured to discharge first ink, a second nozzle row including a plurality of second nozzles configured to discharge second ink, a third nozzle row including a plurality of third nozzles configured to discharge third ink, and a fourth nozzle row including a plurality of fourth nozzles configured to discharge fourth ink;

the third nozzle row is provided between the first nozzle row and the second nozzle row in the relative movement direction;

the fourth nozzle row is provided between the first nozzle row and the third nozzle row in the relative movement direction;

the recording control device comprises a processor that is configured to form an edge portion of an output image to be formed on the medium, and that is configured to form a non-edge portion of the output image are provided, the edge portion being adjacent to the non-edge portion and disposed in a first direction relative to the non-edge portion; and when the first ink to be discharged from the first nozzle is replaced at least by the second ink to be discharged from the second nozzle, the third ink to be discharged from the third nozzle, and the fourth ink to be discharged from the fourth nozzle, the processor forms the edge portion in such a manner that a first use rate is lower than a second use rate and a third use rate is lower than a fourth use rate, the first use rate being a use rate of the second nozzle for the edge portion, the second use rate being a use rate of the second nozzle for the non-edge portion, the third use rate being a use rate of the third nozzle for the edge portion, the fourth use rate being a use rate of the third nozzle for the non-edge portion.

2. The recording control device according to claim 1, wherein
the recording head includes a nozzle surface in which a nozzle included in the plurality of nozzle rows is disposed; and
when an inclination of the recording head in a direction of rotation along the nozzle surface is a second inclination greater than a first inclination, the processor sets the first use rate to be lower than when the inclination is the first inclination.

3. The recording control device according to claim 1, wherein the processor forms the edge portion without using the second nozzle.

4. The recording control device according to claim 1, wherein the output image includes a code image.

5. The recording control device according to claim 1, wherein when the first ink to be discharged from the first nozzle is replaced at least by the second ink to be discharged from the second nozzle, the third ink to be discharged from the third nozzle, and the fourth ink to be discharged from the fourth nozzle, the processor forms the edge portion in such a manner that the first use rate is lower than the third use rate.

6. A recording control method of controlling recording on a medium by a recording head including a plurality of nozzle rows, and a relative movement of the recording head and the medium in a relative movement direction that intersects a nozzle alignment direction of the nozzle row, wherein
the plurality of nozzle rows include a first nozzle row including a plurality of first nozzles configured to discharge first ink, a second nozzle row including a plurality of second nozzles configured to discharge second ink, a third nozzle row including a plurality of third nozzles configured to discharge third ink, and a fourth nozzle row including a plurality of fourth nozzles configured to discharge fourth ink;
the third nozzle row is provided between the first nozzle row and the second nozzle row in the relative movement direction; and
the fourth nozzle row is provided between the first nozzle row and the third nozzle row in the relative movement direction,
the method comprising forming an edge portion of an output image on the medium in such a manner that a first use rate is lower than a second use rate and a third use rate is lower than a fourth use rate when the first ink to be discharged from the first nozzle is replaced at least by the second ink to be discharged from the second nozzle, the third ink to be discharged from the third nozzle, and the fourth ink to be discharged from the fourth nozzle, the first use rate being a use rate of the second nozzle for the edge portion of the output image, the second use rate being a use rate of the second nozzle for an non-edge portion of the output image, the third use rate being a use rate of the third nozzle for the edge portion, the fourth use rate being a use rate of the third nozzle for the non-edge portion, the edge portion being adjacent to the non-edge portion and disposed in a first direction relative to the non-edge portion.

* * * * *